US012668263B2

(12) United States Patent
Cho et al.

(10) Patent No.: US 12,668,263 B2
(45) Date of Patent: Jun. 30, 2026

(54) GUIDANCE METHOD AND GUIDANCE DEVICE

(71) Applicant: Wistron Corporation, New Taipei City (TW)

(72) Inventors: Ching An Cho, New Taipei City (TW); Chih Hao Chiu, New Taipei City (TW); Zhu Xuan Xie, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 0 days.

(21) Appl. No.: 18/961,265

(22) Filed: Nov. 26, 2024

(65) Prior Publication Data

US 2026/0103210 A1 Apr. 16, 2026

(30) Foreign Application Priority Data

Oct. 15, 2024 (TW) ................................. 113139123

(51) Int. Cl.
*B60Q 1/00* (2006.01)
*B60K 35/28* (2024.01)
*B60W 50/14* (2020.01)
*G06V 20/56* (2022.01)

(52) U.S. Cl.
CPC ............. *B60W 50/14* (2013.01); *B60K 35/28* (2024.01); *G06V 20/588* (2022.01); *B60K 2360/166* (2024.01); *B60K 2360/176* (2024.01); *B60W 2050/146* (2013.01); *B60W 2420/403* (2013.01); *B60W 2520/10* (2013.01); *B60W 2552/30* (2020.02); *B60W 2552/53* (2020.02)

(58) Field of Classification Search
CPC ........... B60W 50/14; B60W 2050/146; B60W 2420/403; B60W 2520/10; B60W 2552/30; B60W 2552/53; B60K 35/28; B60K 2360/166; B60K 2360/176; G06V 20/588
USPC ........................ 340/425.5, 438, 439, 456.435
See application file for complete search history.

(56) References Cited

U.S. PATENT DOCUMENTS

| | | | | |
|---|---|---|---|---|
| 7,783,420 B2 * | 8/2010 | Oonishi | ............. | G01C 21/3658 |
| | | | | 701/417 |
| 11,518,384 B2 | 12/2022 | Lee | | |
| 2020/0180619 A1 | 6/2020 | Lee | | |
| 2021/0319237 A1 * | 10/2021 | Kim | ..................... | G06V 10/755 |
| 2023/0048230 A1 | 2/2023 | Lee | | |
| 2023/0221569 A1 * | 7/2023 | Ohyama | ............. | B60K 35/235 |
| | | | | 701/523 |

(Continued)

FOREIGN PATENT DOCUMENTS

CN 117799605 4/2024

*Primary Examiner* — Anh V La
(74) *Attorney, Agent, or Firm* — JCIPRNET

(57) ABSTRACT

Disclosed are a guidance method and a guidance device. The image and speed are obtained, where the image corresponds to the field of view in the traveling direction of the vehicle, and the speed is the movement speed of the vehicle. Road block is identified in the image, where the road block is an image block corresponding to road. The lane curvature corresponding to the road block is converted into a curvature factor according to the speed, where the lane curvature corresponds to the curvature of the road block. Guidance graphic is generated based on curvature factors. Guidance graphic is presented. Therefore, intuitive instruction is provided, and driving safety is improved.

20 Claims, 14 Drawing Sheets

(56) References Cited

U.S. PATENT DOCUMENTS

| | | | | |
|---|---|---|---|---|
| 2025/0012591 A1* | 1/2025 | Fan | .................... | G01C 21/3658 |
| 2025/0216214 A1* | 7/2025 | Kwon | ................ | G01C 21/3667 |

\* cited by examiner

GUIDANCE METHOD AND GUIDANCE DEVICE

CROSS-REFERENCE TO RELATED APPLICATION

This application claims the priority benefit of Taiwan application serial no. 113139123, filed on Oct. 15, 2024. The entirety of the above-mentioned patent application is hereby incorporated by reference herein and made a part of this specification.

BACKGROUND

Technical Field

The present disclosure relates to an image processing technology, and more particularly to an image-based guidance method and guidance device.

Description of Related Art

Contemporarily, people frequently rely on navigation systems while operating motor vehicles, ambulating, or utilizing two-wheeled conveyances. These systems typically present directional or turning instructions through visual or auditory means. Generally, such systems may employ traffic signals or signs corresponding to geographical information, or customized iconography to convey such instructions. However, users in transit must simultaneously maintain awareness of road conditions and are prone to overlooking instructions. Consequently, there exists a necessity to assist individuals in more clearly comprehending their forthcoming route of travel and to enhance safety measures.

SUMMARY

The present disclosure provides a guidance method and a guidance device, which may improve the visibility of instructions.

The guidance method in an embodiment of the present disclosure includes (but is not limited to) the following steps: obtaining the image and speed, wherein the image corresponds to the field of view in the traveling direction of the vehicle, and the speed is the movement speed of the vehicle; identifying the road block in the image, wherein the road block is an image block corresponding to the road; converting the lane curvature corresponding to the road block into a curvature factor according to the speed, wherein the lane curvature corresponds to the curvature of the road block; generating the guidance graphic based on the curvature factor; and presenting the guidance graphic.

The guidance device in an embodiment of the present disclosure includes, but is not limited to, a storage and a processor. The storage stores program code. The processor is coupled to the storage. The processor loads and executes the program code to perform the following operations: obtaining the image and speed, wherein the image corresponds to the field of view in the traveling direction of the vehicle, and the speed is the movement speed of the vehicle; identifying the road block in the image, wherein the road block is an image block corresponding to the road; converting the lane curvature corresponding to the road block into a curvature factor according to the speed, wherein the lane curvature corresponds to the curvature of the road block; generating the guidance graphic based on the curvature factor; and presenting the guidance graphic.

Based on the foregoing, the guidance method and guidance device in an embodiment of the present disclosure may convert the curvature corresponding to the image blocks of the road into the curvature factor according to the movement speed of the vehicle, and generate the guidance graphic accordingly. In this way, it is possible to provide visual guidance graphics that conform to the road ahead and the movement speed, thereby enhancing the recognizability of guidance and the safety of progression.

In order to make the above-mentioned features and advantages of the present disclosure more obvious and easy to understand, embodiments are given below and described in detail with reference to the attached drawings.

DESCRIPTION OF THE EMBODIMENTS

In road guidance systems, such as Augmented Reality (AR) Navigation, the core technology relies on lane detection to enhance the accuracy and intuitiveness of navigation. These systems utilize high-precision lane detection technology to accurately delineate the image area of the lane where the driver is currently traveling on and overlay a specific transparent color on the road image. This display method not only assists drivers in clearly identifying their current lane but also provides them with an improved visual comprehension of the surrounding road environment.

Furthermore, such systems actively utilize arrow indicators during the navigation process to guide drivers on upcoming road conditions. These arrows are typically displayed at times when turns or lane changes are imminent, visually and clearly informing the driver of the forthcoming route. This form of guidance is particularly crucial in complex road segments, as it effectively reduces the cognitive load on the driver and enhances driving safety.

Figure 1:
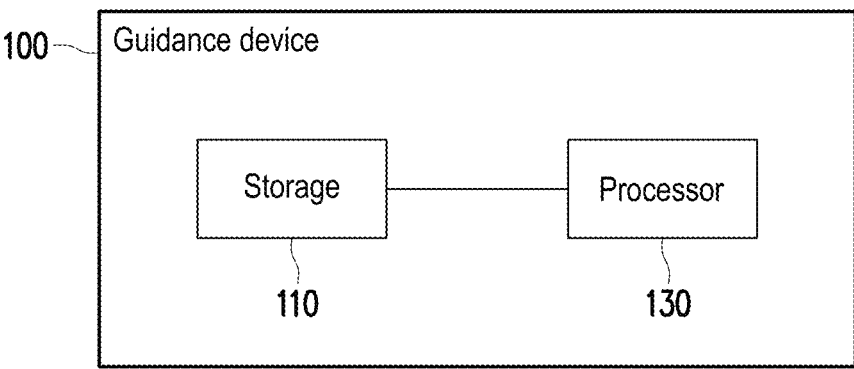
FIG. 1 is a component block diagram of a guidance device according to an embodiment of the present disclosure.

FIG. 1 is a component block diagram of a guidance device 100 according to an embodiment of the present disclosure. Referring to FIG. 1, the guidance device 100 includes, but is not limited to, a storage 110 and a processor 130. The guidance device 100 may be a mobile phone, a tablet computer, a laptop computer, a desktop computer, a server, a voice assistant device, a smart home appliance, a wearable device, an in-vehicle system, or other electronic device.

The storage 110 may include any type of fixed or removable random access memory (RAM), read-only memory (ROM), flash memory, conventional hard disk drive (HDD), solid-state drive (SSD), or similar components. In an embodiment, the storage 110 is utilized for storing program code, software modules, configuration settings, data (such as, but not limited to, images, motion parameters, curvature, factors, graphs, or location information), or files, as will be further described in subsequent embodiments.

The processor 130 is coupled to the storage 110. The processor 130 may be a Central Processing Unit (CPU), Graphics Processing Unit (GPU), or other programmable general-purpose or special-purpose microprocessors, Digital Signal Processors (DSP), Programmable Controllers, Field Programmable Gate Arrays (FPGA), Application-Specific Integrated Circuits (ASIC), Neural Network Accelerators, or other similar components, or a combination thereof. In an embodiment, the processor 130 is utilized to execute all or part of the operations of the guidance device 100, and may load and execute various program codes, software modules, files, and data stored in the storage 110.

In the following text, the method described in an embodiment of the present disclosure shall be elucidated in conjunction with the various devices, components, and modules of the guidance device 100. The processes of this method may be adjusted according to the implementation circumstances and are not limited to those described herein.

Figure 2:
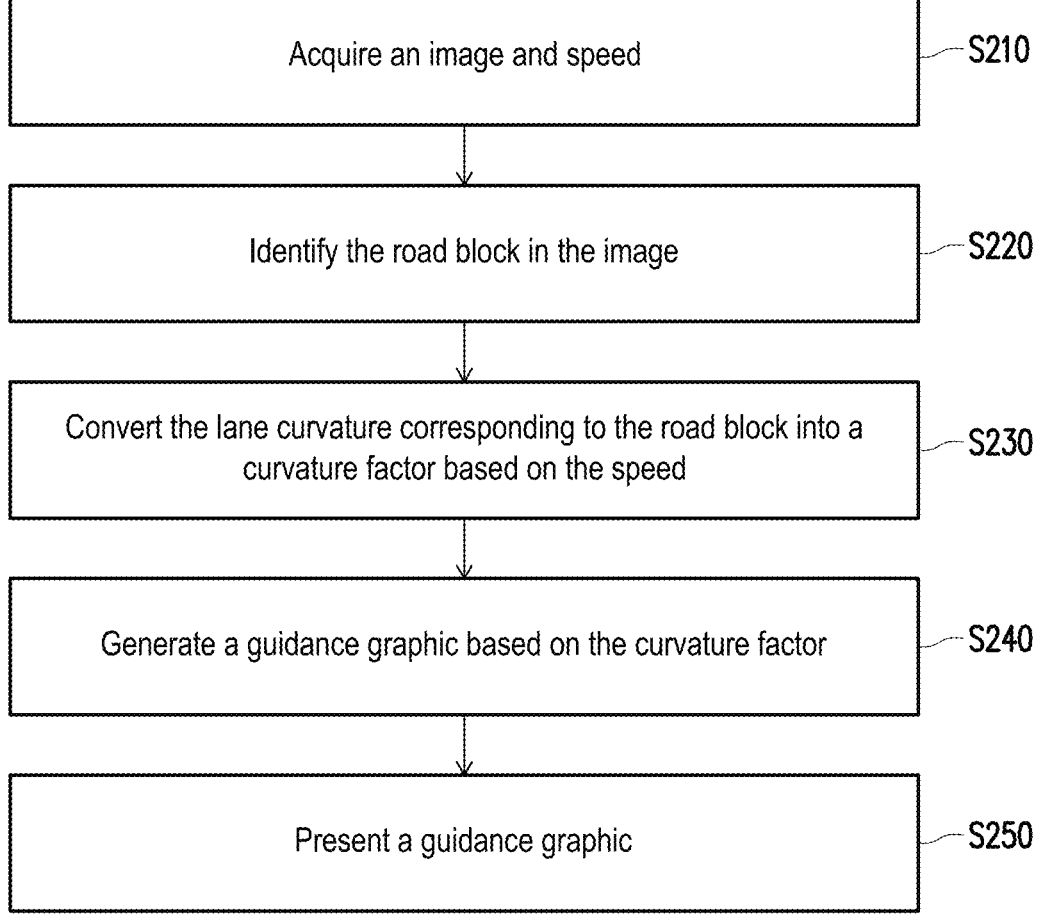
FIG. 2 is a flowchart illustrating a guidance method according to an embodiment of the present disclosure.

FIG. 2 is a flowchart illustrating a guidance method according to an embodiment of the present disclosure. Referring to FIG. 2, the processor 130 acquires an image and speed (step S210). Specifically, the image corresponds to a field of view in the traveling direction of the vehicle. The vehicle may be any type of conveyance, such as a motorcycle, scooter, bicycle, or truck. An image capturing device (not shown in the figure) may be mounted, installed, or placed on the vehicle. The image capturing device may be, for example, a camera, a video camera, a dashboard camera, a camera module, or other device or circuit with image capturing functionality. In an embodiment, the processor 130 obtains the image from the image capturing device. For instance, the image may be transmitted via wired or wireless communication connection.

Figure 3:
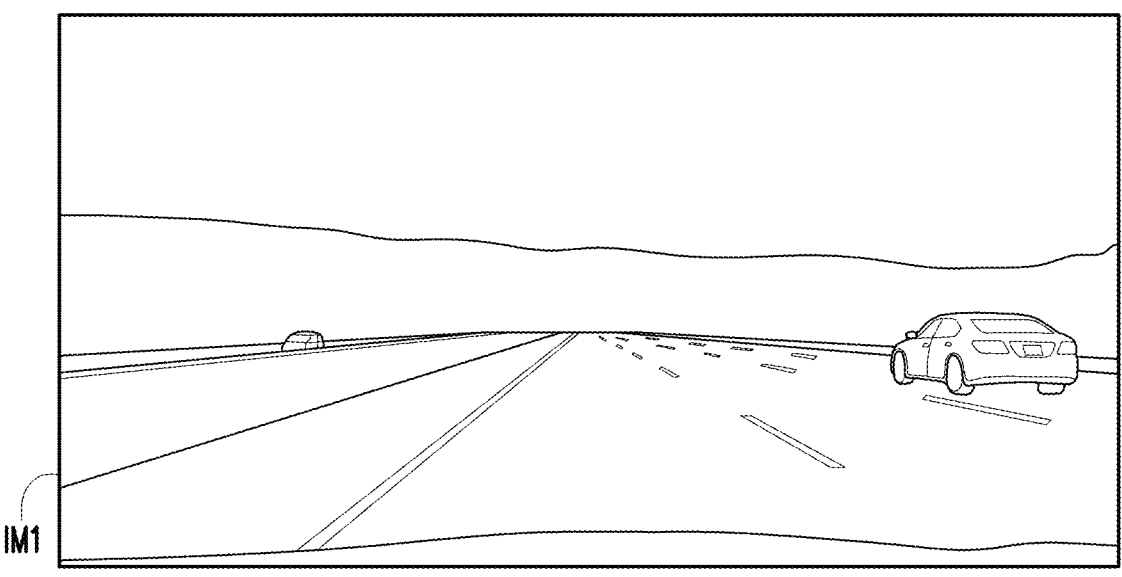
FIG. 3 is a schematic diagram of an image according to an embodiment of the present disclosure.

The field of view in the traveling direction refers, for example, to the forward view of a vehicle. For instance, FIG. 3 illustrates an image IM1 in accordance with an embodiment of the present disclosure. With reference to FIG. 3, the image content of the image IM1 corresponds to the field of view in front of the vehicle (i.e., the traveling direction is forward). The image content includes, for example, road markings, other vehicles, and surrounding scenery. It should be noted that the size and shape of the field of view are based on the specifications of the image capturing device or subsequent image processing, and the embodiments of the present disclosure are not limited in this regard.

Speed refers to the movement speed of a vehicle. In one embodiment, the processor 130 may obtain motion parameters through an Inertial Measurement Unit (IMU). The motion parameters are values or intensities related to speed and/or acceleration. The processor 130 may convert motion parameters into movement speed. For instance, the value of speed may be directly used as movement speed, or the value of acceleration may be integrated to obtain movement speed. In another embodiment, the processor 130 may utilize the speedometer reading or the mechanical speed detected by the onboard system as the movement speed of the vehicle. In yet another embodiment, the speed may take into account the pitch of the road surface on which the vehicle is traveling, which will be elaborated upon in subsequent embodiments.

In an embodiment, the image corresponds to a real-time image at the current time point or within the current time interval. The speed corresponds to the instantaneous speed at the current time point or the average speed within the current time interval.

Please refer to FIG. 2. The processor 130 identifies the road block in the image (step S220). Specifically, the road block refers to the image block corresponding to the road. When the vehicle is traveling on a lane, the road may be captured in the image. The image corresponds to multiple pixels. For example, the pixels of the photosensitive component of the image capturing device may be 1920×1080. The combination of pixels corresponding to the road (i.e., the pixels where the road is imaged) constitutes the road block.

In an embodiment, the processor 130 may identify road blocks in images through object detection technology. In an implementation, the object detection technology may refer to lane detection technology. For instance, object detection (e.g., lane detection) may be achieved through the application of neural network-based algorithms (such as You Only Look Once (YOLO), Region-Based Convolutional Neural Networks (R-CNN), or Fast R-CNN) or feature matching-based algorithms (such as feature matching using Histogram of Oriented Gradients (HOG), Scale-Invariant Feature Transform (SIFT), Haar, or Speeded Up Robust Features (SURF)).

In some embodiments, prior to the identification of road blocks, the processor 130 may perform image processing on the image. In an embodiment, the processor 130 may calibrate the image. For instance, the processor 130 loads camera parameters and perspective transformation matrices for image calibration to eliminate distortions caused by image capture. The processor 130 may obtain camera parameters through calibration methods. Camera parameters may include, but are not limited to, distortion coefficients, rotation vectors, and translation vectors, which may vary depending on the specific application context. The perspective transformation matrix is a transformation matrix that converts the forward perspective view to a bird's-eye view. For example, four points are selected in the image and mapped to corresponding points in the desired bird's-eye view.

In an embodiment, the processor 130 may perform preprocessing on the image. The preprocessing includes format conversion and distortion correction. With regard to format conversion, the processor 130 may convert the raw image data into images in Red-Green-Blue (RGB) format, Blue-Green-Red (BGR) format, and grayscale format. Subsequently, based on the format of the input image, the input image is converted to the specified format. For example, if the input image is in Blue-Green-Red format, the input image is converted into images in Red-Green-Blue format and grayscale format. With respect to distortion correction, previously loaded or calculated camera calibration parameters are used to correct the image, thereby eliminating distortions caused by the lens.

In an embodiment, the processor 130 may perform a perspective transformation on the image. The perspective transformation is utilized to convert the image from a driver's perspective to a bird's-eye view perspective, which facilitates the detection of lane markings by the processes within processor 130. The processor 130 may employ a pre-loaded transformation matrix to transform the corrected image into a bird's-eye view. The transformed perspective renders the detection of lane markings more intuitive and facile.

In an embodiment, the processor 130 may perform thresholding or binarization processing on the image. Thresholding or binarization processing is the conversion of an image from grayscale to a binary image containing only black and white colors. This is accomplished through the application of threshold operations, color filtering techniques, and edge detection methods, which serve to accentuate lane markings while simultaneously reducing interference from other irrelevant features. By these means, lane markings may be more distinctly identified. It should be noted that the positions of the lane markings are utilized to define the boundaries of the lane blocks.

In an embodiment, for the identification of lane blocks, the processor 130 may perform lane line pixel detection on the image. For instance, after obtaining a binarized bird's-eye view, the subsequent step is to identify the specific positions of the lane lines. The processor 130 may employ object detection techniques (e.g., lane line detection technology), utilizing the sliding window method to locate pixels corresponding to lane lines. The sliding window technique is utilized to progressively search and track pixels of lane line (i.e., pixels where road lines are imaged) from bottom to top (or in other directions) within the image. The sliding window technique involves identifying peaks at the bottom of the image and searching for consecutive peaks within each window to track the lane lines.

Figure 4:
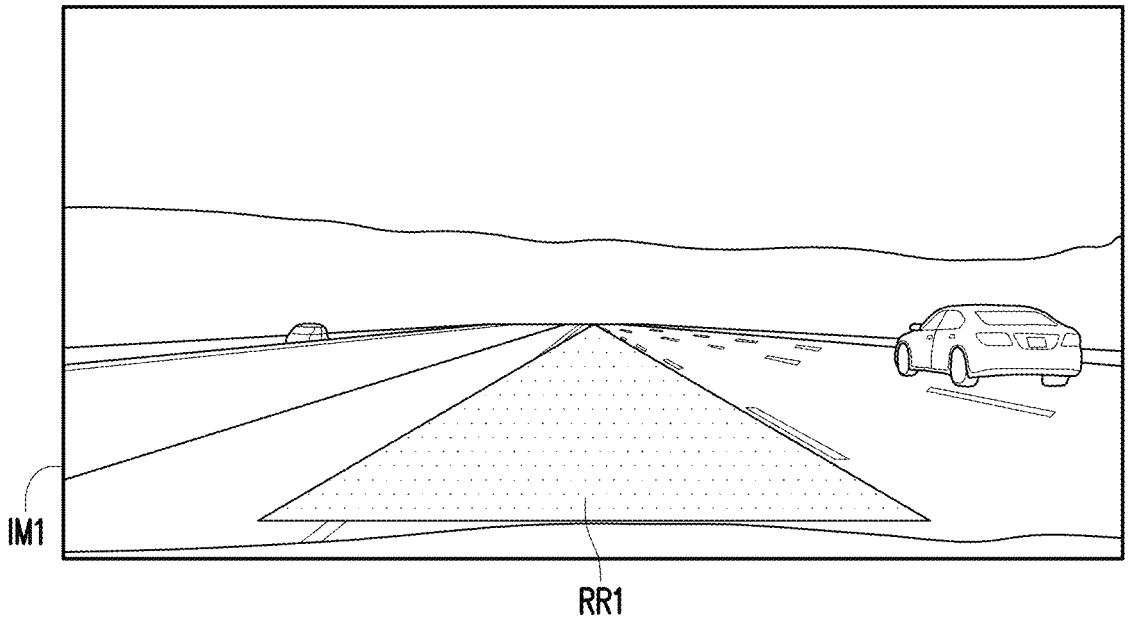
FIG. 4 is a schematic diagram of a road block according to an embodiment of the present disclosure.

For example, FIG. 4 is a schematic diagram of a road block RR1 according to an embodiment of the present disclosure. Referring to FIG. 3 and FIG. 4, the road block RR1 corresponds to the road portion in the image IM1. It should be noted that the road block RR1 shown in FIG. 4 corresponds to a single lane; however, in practical applications, multiple lanes may be identified, and the embodiments of the present disclosure are not limited in this regard.

Please refer to FIG. 2. The processor 130 converts the lane curvature corresponding to the road block into a curvature factor based on the speed (step S230). Specifically, the lane curvature corresponds to the degree of curvature of the road block. To obtain a reference area/block of a road in the current image frame, the processor 130 may use polynomial fitting to obtain a second-order polynomial equation for describing the distribution of lane lines. The processor 130 may fit the pixels (also known as pixel points) of the identified road block into a second-order polynomial equation. The mathematical expression of the second-order polynomial equation for the distribution of lane lines is, for example, $y=A×x^2+B×x+C$, where x and y are the pixel coordinates corresponding to the lane lines in the image block, and A, B, and C are coefficients/constants.

The purpose of polynomial fitting is as follows:

To describe the shape of lane markings: Lane markings present a curved form in visual perception. The utilization of polynomials (such as second-order or third-order) effectively simulates this curvature;

For data denoising: Due to factors such as road surface conditions and lighting variations, the pixel points of lane markings may contain noise. Polynomial fitting aids in smoothing this noise, thereby providing a clear and continuous estimation of the lane markings;

To enhance algorithm robustness: Polynomial fitting renders lane detection more robust. Even in situations where lane markings are partially missing or obstructed, the processor 130 is capable of inferring the complete shape of the lane markings.

The calculation formula for the curvature R of the lane is $$R = \frac{\left(1 + (2*A*i + B)^2\right)^{3/2}}{|2*A|},$$

wherein A and B are the coefficients of the aforementioned second-order polynomial equation representing the lane line distribution. Specifically, in the calculation of the curvature R of the lane, the second-order polynomial $y=A \times x^2+B \times x+C$ defines the entire curve. When calculating the curvature R of the lane, the curvature at point x reflects the degree of curvature of the curve at that position.

In an embodiment, the processor 130 may optionally select the bottom portion (e.g., the position closest to the vehicle) of the lane line/road block to calculate the curvature, and utilize this as the lane curvature at the current position of the vehicle. For instance, the position at the bottom of the road block RR1 shown in FIG. 4 may be designated as the current position of the vehicle, and the corresponding curvature R of the lane may be derived therefrom.

In an embodiment, the processor 130 may convert the pixel coordinates of the image to actual world coordinates (for example, in meters), and utilize the actual length represented by each pixel (for example, meters per pixel). Consequently, a numerical value of the actual lane curvature may be obtained.

The values of lane curvature and speed influence the curvature factor. In an embodiment, the processor 130 may determine the difference in curvature between the reference curvature and the absolute value of the lane curvature. The reference curvature may be used to determine whether the current road (block) is curved (i.e., a curved road), and the value thereof is an empirical constant that may be related to camera parameters and/or position. For example, the reference curvature may be 1200. To determine whether a road (block) is curved, comparison may be performed to see if the lane curvature is less than the reference curvature. For instance, in response to the reference curvature being greater than the lane curvature, the road (block) is determined to be curved; in response to the reference curvature not being greater than (i.e., less than or equal to) the lane curvature, the road (block) is determined to be straight or not curved. To determine the direction of curvature for a road (block), the lane curvature of the left boundary line of the lane/road block may be compared to the lane curvature of the right boundary line of the lane/road block. For example, in response to the lane curvature of the left boundary line being greater than the lane curvature of the right boundary line, the road (block) is determined to be a left-curving road; in response to the lane curvature of the left boundary line being less than the lane curvature of the right boundary line, the road (block) is determined to be a right-curving road.

The curvature difference is, for example, the difference obtained by subtracting the absolute value of the lane curvature from the reference curvature. The mathematical expression for the curvature difference is $C_{TH}-|R|$, wherein $C_{TH}$ represents the reference curvature, and R denotes the lane curvature.

The processor 130 may determine the speed ratio, which is the proportion of the speed of the vehicle to the reference speed. The reference speed, for example, may be 60 kilometers per hour, but is not limited thereto. The mathematical expression for the speed ratio is $$\frac{V_{vehicle}}{R_v},$$

wherein $V_{vehicle}$ represents the speed of the vehicle, and $R_v$ denotes the reference speed.

The processor 130 may determine the curvature factor based on the curvature difference and the speed ratio. In an embodiment, the curvature factor is directly proportional to the curvature difference. For instance, in response to a greater curvature difference, the curvature factor increases; conversely, in response to a smaller curvature difference, the curvature factor decreases. In an embodiment, the curvature factor is directly proportional to the speed ratio. For example, in response to a higher speed ratio, the curvature factor increases; conversely, in response to a lower speed ratio, the curvature factor decreases.

In an embodiment, the processor 130 may calculate the product of the curvature difference, speed ratio, and the reciprocal of the proportional factor as the curvature factor. For instance, the mathematical expression for the curvature factor F is represented as $$F = \frac{C_{TH}-|R|}{\text{Ratio}} \times \frac{V_{Car}}{R_v},$$

wherein $C_{TH}$ denotes the reference curvature, R denotes the lane curvature, Ratio denotes the proportional factor, $V_{vehicle}$ denotes the speed of the vehicle, and $R_v$ denotes the reference speed. The proportional factor, also referred to as the drawing proportional factor, controls the rate of change and range of the guidance graphic (to be introduced in subsequent embodiments) on the current image. For example, given an image resolution of 1280×720, approximately one-eighth of its horizontal axis length (i.e., 1280 pixel units) is taken as the application setting, wherein the proportional factor Ratio is 150, but is not limited thereto. It should be noted that the aforementioned example only utilizes the horizontal axis length for setting the proportional factor, as the subsequent generation of the guidance graphic relates to the horizontal movement of the reference point. However, depending on different application scenarios, the length of other axes may be selected for setting the proportional factor.

In an embodiment, in response to the reference curvature being greater than the absolute value of the lane curvature (i.e., $C_{TH}>|R|$), the processor 130 may calculate the product of the curvature difference, the speed ratio, and the reciprocal of the proportional coefficient as the curvature factor. For example, the curvature factor may be calculated using the aforementioned mathematical expression for the curvature factor F. Conversely, in response to the reference curvature not being greater than the absolute value of the lane curvature (i.e., $C_{TH} \leq |R|$), the processor 130 may set the curvature factor to an initial value. The initial value may be, for instance, 1, but is not limited thereto.

In an embodiment, the processor 130 may determine the speed based on the pitch of the road and the sensed speed of the vehicle. The processor 130 may obtain motion parameters through an Inertial Measurement Unit (IMU). The motion parameters are values or intensities related to speed and/or acceleration. The processor 130 may convert the motion parameters into a sensed speed.

Figure 5:
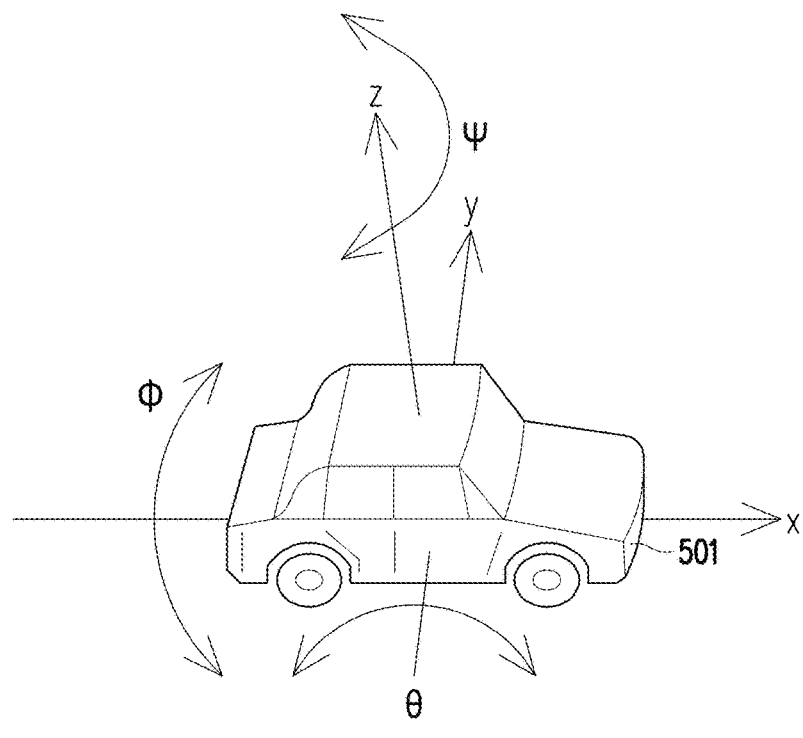
FIG. 5 is a schematic diagram illustrating an angle according to an embodiment of the present disclosure.

Furthermore, FIG. 5 is a schematic diagram illustrating an angle according to an embodiment of the present disclosure. Referring to FIG. 5, an inertial measurement unit typically includes motion sensors such as a gyroscope and an accelerometer. By installing the inertial measurement unit or other attitude/motion sensors on the body of a vehicle 501 (using an automobile as an example), the angular speed and acceleration of the vehicle 501 along three axes X, Y, and Z may be obtained. Based on this data, the pitch angle θ corresponding to the road pitch may be derived, and even the rotational angles of the vehicle 501 corresponding to the other two axes X and Z (for example, the yaw angle Ψ and the roll angle φ) may be determined.

The angular speed obtained from the gyroscope, integrated over time, $\Delta\theta_p=\int\omega\cdot dt$, yields the pitch (in radians). Alternatively, the pitch (measured in radians) may be obtained using the following formula related to acceleration $$A_X: \theta_p = \tan^{-1}\left(\frac{A_X}{\sqrt{A_Y^2 + A_Z^2}}\right)$$

($A_X$ represents the acceleration along the X-axis; $A_Y$ represents the acceleration along the Y-axis; $A_Z$ represents the acceleration along the Z-axis.) In some embodiments, the processor 130 may fuse data from the accelerometer with data from the gyroscope. For instance, a Kalman filter may be employed to mitigate gyroscope drift and accelerometer noise, thereby obtaining a more accurate and reliable pitch measurement.

Figure 6A:
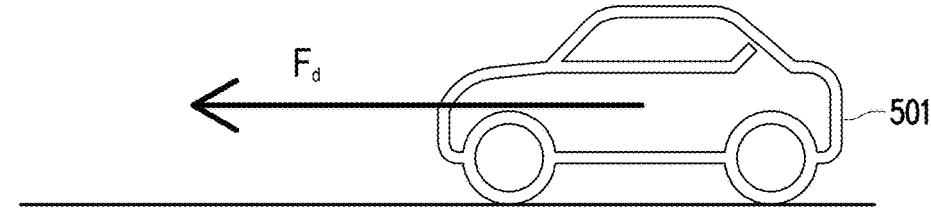
FIG. 6A is a schematic diagram illustrating the mechanics of a level road according to an embodiment of the present disclosure.

FIG. 6A is a schematic diagram illustrating the mechanics of a level road according to an embodiment of the present disclosure. Referring to FIG. 6A, in the absence of other forces, the vehicle 501 travels in a straight line using the same driving force $F_d$.

Figure 6B:
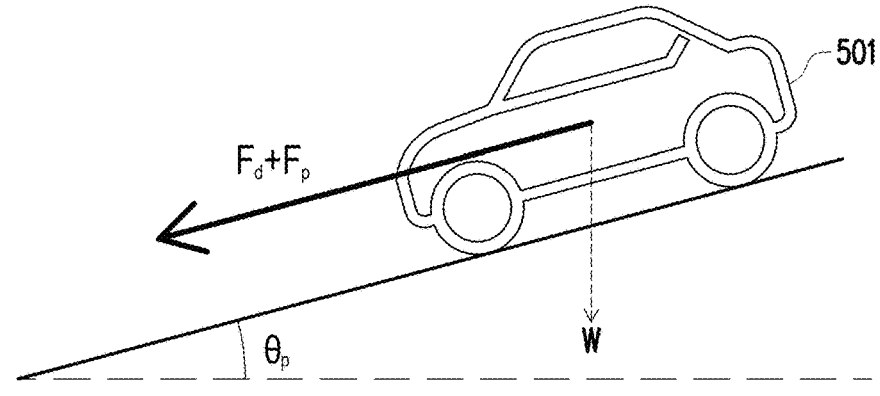
FIG. 6B is a schematic diagram illustrating the mechanics of a downhill road according to an embodiment of the present disclosure.

FIG. 6B is a schematic diagram illustrating the mechanics of a downhill road according to an embodiment of the present disclosure. Referring to FIG. 6B, the motion on a downhill road considers not only the driving force $F_d$ of the vehicle 501 itself, but also the sliding force $F_p$. W=m×g, where W represents the weight of the vehicle 501, m denotes the mass of the vehicle 501, and g signifies the gravitational acceleration (e.g., 9.81 ms$^{-2}$). The sliding force $F_p$ is calculated as Fp=W×sin $\theta_p$, where $\theta_p$ represents the pitch.

Due to the increase in speed during descent, the mathematical expression for the curvature factor F on downhill roads is:

$$F = \frac{C_{TH} - |R|}{Ratio} \times \frac{V'_{Car}}{R_v},$$

wherein the speed $V'_{Car}$ is expressed as $V_{car}$+g sin $\theta_p$t, where $V_{car}$ denotes the sensed speed, and t represents the duration of downhill travel.

Referring to FIG. 2, the processor 130 generates a guidance graphic based on the curvature factor (step S240). Specifically, the guidance graphic is a visualized graphic/pattern used to indicate the degree of road curvature. The guidance graphic may be an arrow, triangle, or other graphical representation. It is noteworthy that, as previously mentioned, the curvature factor in the embodiment of the present disclosure further incorporates speed as an influencing factor. For instance, the numerical value of speed correlates with the numerical value of the curvature factor.

In an embodiment, the processor 130 may alter the position of at least one of the multiple reference points of the reference graphic based on the curvature factor. The connections between these reference points form the reference graphic.

Figure 7A:
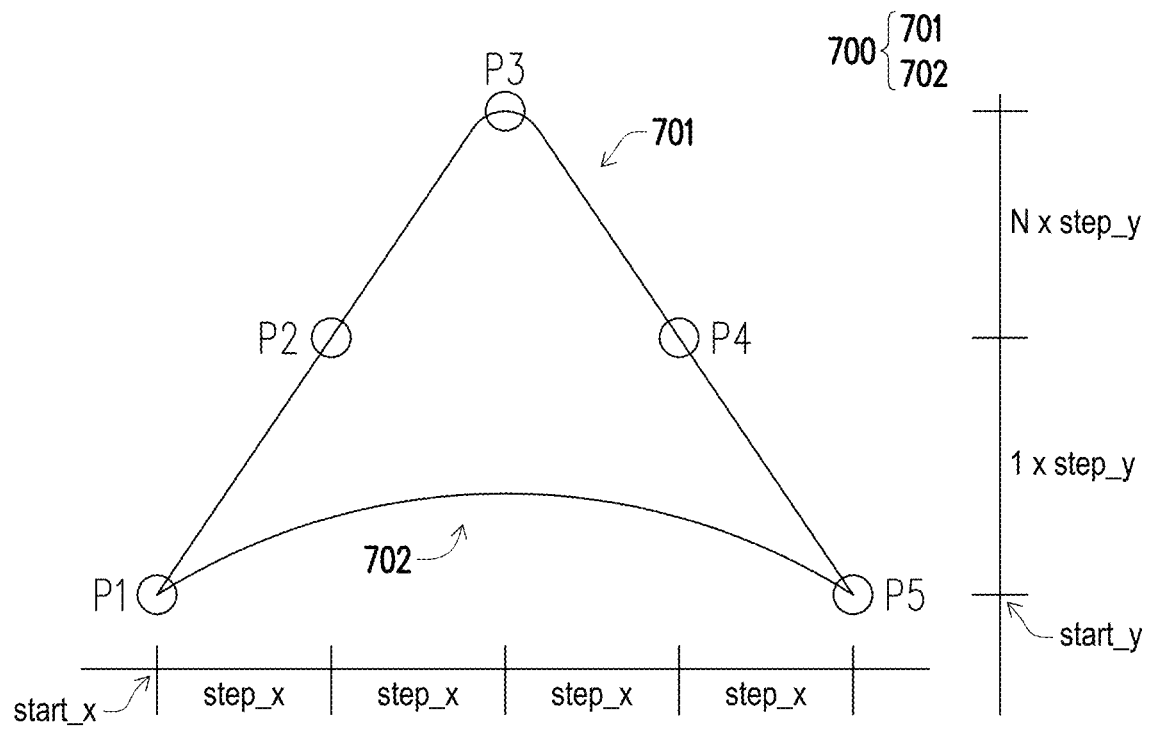
FIG. 7A is a schematic diagram of a first reference graphic according to an embodiment of the present disclosure.

In an embodiment, the reference graphic is an arrowhead. FIG. 7A is a schematic diagram of a first reference graphic 700 according to an embodiment of the present disclosure. Referring to FIG. 7A, the first reference graphic 700 is an arrowhead. Arrows may be used to indicate direction and may be utilized to represent the degree of curvature and/or direction corresponding to a road block. An arrow may include a head and a shaft. The first reference graphic 700 includes an upper line 701 and a lower line 702. The upper line 701 and the lower line 702 form the first reference graphic 700. For instance, the two endpoints of the upper line 701 are connected to the two endpoints of the lower line 702.

Regarding the upper line 701, the upper line 701 includes reference points P1, P2, P3, P4, and P5. The horizontal distance step_x between adjacent reference points in the upper line 701 is uniform. For instance, X|P1-P2|=X|P2-P3|=X|P3-P4|=X|P4-P5|=step_x. The value step_x serves as the fundamental unit of length on the horizontal axis and may be related to the width of the road block (e.g., step_x may be ¹⁄₂₀ of the width of the road block). The term X|P1-P2| denotes the horizontal distance between reference points P1 and P2 on the horizontal axis (e.g., X-axis), and so forth for the remaining points. The horizontal axis origin start_x represents the initial position of the reference graphic 700 on the horizontal axis, while the vertical axis origin start_y represents the initial position of the reference graphic 700 on the vertical axis. In some embodiments, the distance between reference points P2 and P4 may be adjusted to generate deformations in the arrowhead.

The upper line 701 exhibits a proportional relationship in the vertical axis spacing between adjacent reference points. For instance, Y|P3-P2|=Y|P3-P4|=N*step_y, while Y|P2-P1|=Y|P4-P5|=1*step_y. The term "step_y" denotes the fundamental unit of length along the vertical axis and may correlate to the height of the road block (e.g., step_y may equate to ¹⁄₁₄ of the height of the road block). The term Y|P3-P2| signifies the vertical distance (e.g., along Y-axis) between reference points P3 and P2; similar interpretations apply to the other measurements, which will not be reiterated herein. In the illustration, the multiplier N is exemplified as 2. In some embodiments, the multiplier N may be adjusted to generate variations in the arrowhead.

In an embodiment, the processor 130 may utilize a Bézier curve with M1 points to generate the upper line 701. M1 is a positive integer greater than two. The Bézier curve, for instance, is defined based on the Bernstein polynomial for an nth-degree Bézier curve. M1 reference points may be input into this nth-degree Bézier curve, thereby forming connections between adjacent reference points. As illustrated in FIG. 7A, the line connecting reference point P1 sequentially through reference points P2, P3, P4, and P5 represents a Bézier curve where M1 equals 5.

Figure 7B:
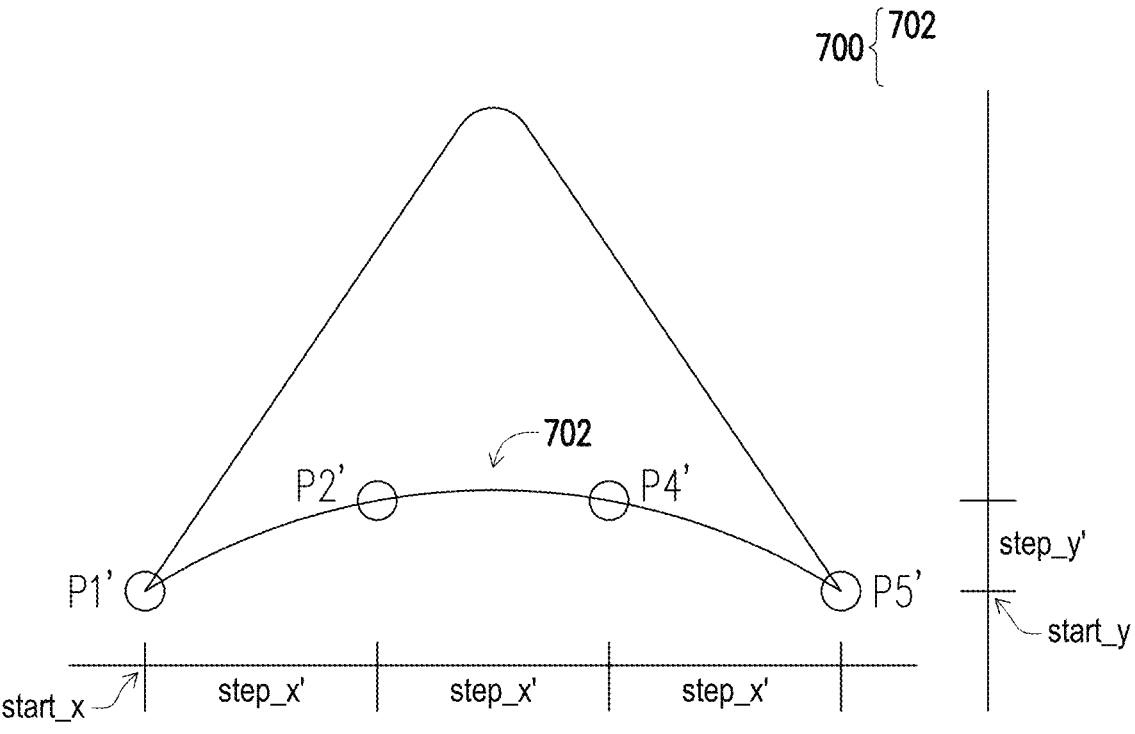
FIG. 7B is a schematic diagram of the lower line according to an embodiment of the present disclosure.

FIG. 7B is a schematic diagram of the lower line 702 according to an embodiment of the present disclosure. Referring to FIG. 7B, the lower line 702 includes reference points P1', P2', P4', and P5'. Reference point P1' is identical to reference point P1 in FIG. 7A, and reference point P5' is identical to reference point P5 in FIG. 7A. The horizontal distance step_x' between adjacent reference points in the lower line 702 is uniform. For instance, X|P1'-P2'|=X|P2'-P3'|=X|P3'-P4'|=X|P4'-P5'|=step_x'. The term step_x' serves as the fundamental unit of length on the horizontal axis and may be related to the width of the road block (e.g., step_x' may be ¹⁄₁₅ of the width of the road block).

In an embodiment, the processor 130 may utilize a Bézier curve with M1-1 points to generate the lower line 702. For instance, the lower line 702 in FIG. 7B includes one fewer reference point than the upper line 701 in FIG. 7A. These M1-1 reference points may be input into this nth-degree Bézier curve, thereby forming connections between adjacent reference points. As illustrated in FIG. 7B, the curve connecting reference points P1', P2', P4', and P5' in sequence is a Bezier curve where M1-1 equals 4. It should be noted that the value of M1 may be adjusted according to actual requirements.

Figure 8:
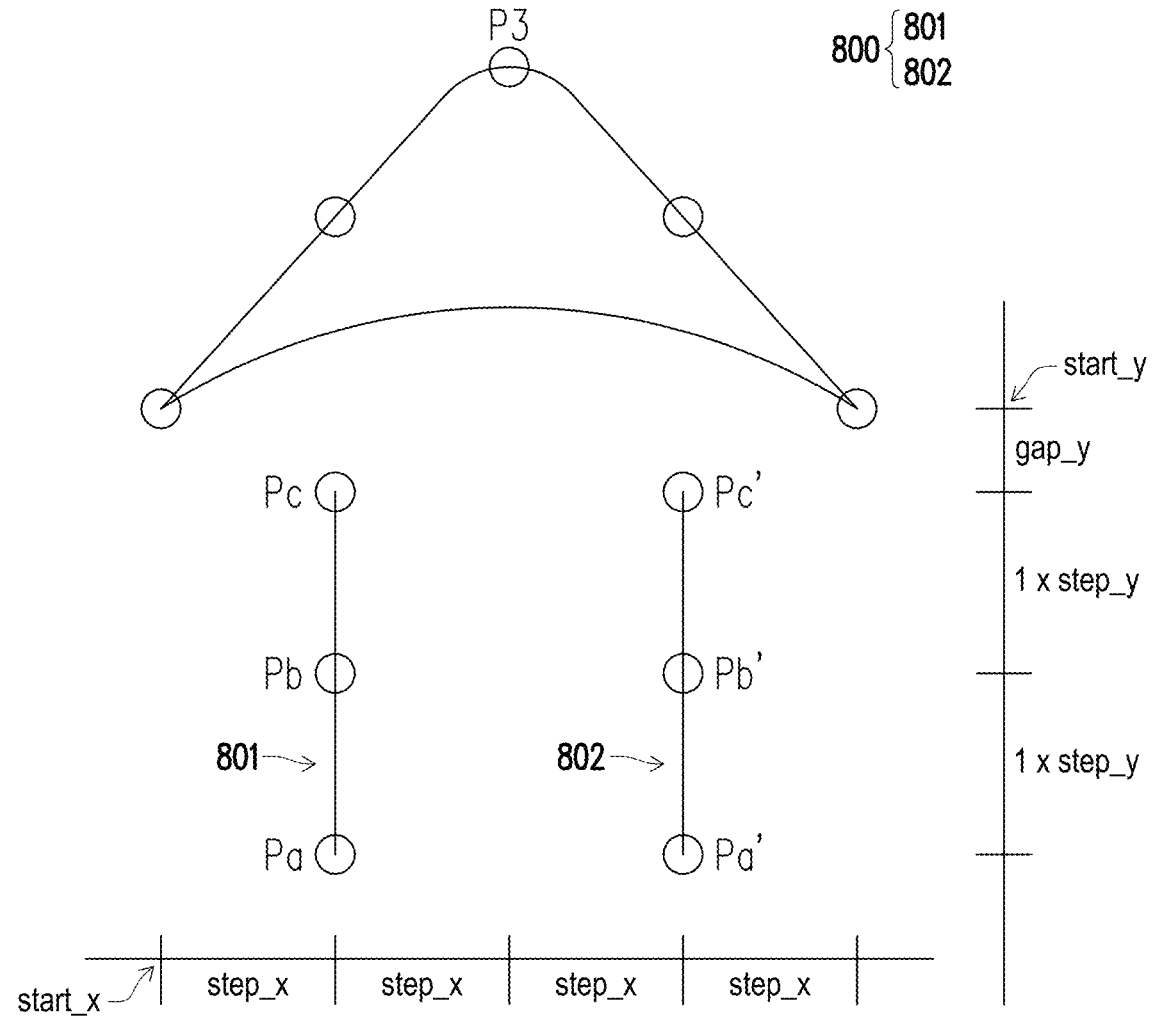
FIG. 8 is a schematic diagram illustrating the left and right lines of the second reference graphic according to an embodiment of the present disclosure.

FIG. 8 is a schematic diagram illustrating the left and right lines 801 and 802 of the second reference graphic 800 according to an embodiment of the present disclosure. Referring to FIG. 8, the second reference graphic 800 depicts an arrow shaft (i.e., the body of an arrow). The arrow shaft may also be utilized to indicate direction and may be employed to represent the degree of curvature and/or direction corresponding to a road block. The second reference graphic 800 includes a left line 801 and a right line 802. The left line 801 and the right line 802 maintain a parallel relationship. The left line 801 and the right line 802 collectively form the second reference graphic 800. In some embodiments, the two endpoints of the left line 801 may further be connected to the two endpoints of the right line 802 (not shown in the figure).

The left line 801 includes reference points Pa, Pb, and Pc. The reference points within the left line 801 are positioned identically along the horizontal axis. For instance, $X|Pa|=X|Pb|=X|Pc|=start\_x+step\_x'$. The term $X|Pa|$ denotes the position of reference point Pa on the horizontal axis (e.g., X-axis), and the same principle applies to the remaining points, which shall not be reiterated herein.

The vertical distance between adjacent reference points in the left line 801 is uniform. For instance, $Y|Pa-Pb|=Y|Pc-Pb|=step\_y$. The term $Y|Pa-Pb|$ denotes the vertical distance between reference points Pa and Pb along the vertical axis (e.g., Y-axis), and similar notation applies to other points, which shall not be reiterated herein. Reference point Pc is vertically displaced from the initial vertical axis position start_y by a distance of gap_y.

In an embodiment, the processor 130 may utilize a Bézier curve with M2 points to generate the left line 801. M2 is a positive integer greater than two. The M2 reference points may be input into an nth-degree Bézier curve, thereby forming connections between adjacent reference points. As illustrated in FIG. 8, the connection passing sequentially from reference point Pa through reference point Pb and reference point Pc represents a Bézier curve where M2 equals 3.

The right line 802 encompasses reference points Pa', Pb', and Pc'. The reference points within the right line 802 maintain identical positions along the horizontal axis. For instance, $X|Pa'|=X|Pb'|=X|Pc'|=start\_x+3*step\_x$. The term $X|Pa'|$ denotes the position of reference point Pa' on the horizontal axis (e.g., X-axis), and the same principle applies to the remaining points, which shall not be reiterated herein.

The vertical distance between adjacent reference points in the right line 802 is uniform. For instance, $Y|Pa'-Pb'|=Y|Pc'-Pb'|=step\_x$. The term $Y|Pa'-Pb'|$ denotes the spacing between reference points Pa' and Pb' on the vertical axis (e.g., Y-axis). The same principle applies to the remaining intervals, and further elaboration is deemed unnecessary herein.

In an embodiment, the processor 130 may utilize a Bezier curve with M2 points to generate the right line 802. M2 is a positive integer greater than two. The M2 reference points may be input into an nth-degree Bézier curve, thereby forming connections between adjacent reference points. As illustrated in FIG. 8, the line passing sequentially through reference points Pa', Pb', and Pc' represents a Bézier curve where M2 equals 3.

The processor 130 is capable of altering the position of one or more reference points of the reference graphic. As the connections between these reference points conform to Bézier curves (i.e., the connections between reference points traverse nth-degree Bézier curves), modifying the positions of the reference points consequently alters the connections between these points, thereby generating the guidance graphic. In other words, the guidance graphic is a graphic formed by the positional changes of one or more reference points of the reference graphic. The guidance graphic also incorporates reference points identical to those of the reference graphic, with only some reference points having altered positions. Consequently, the guidance graphic still adheres to Bézier curves (i.e., the connections between multiple reference points of the guidance graphic traverse nth-degree Bézier curves).

In an embodiment, the plurality of reference points includes a first point. The processor 130 may displace the first point from its original position based on a curvature factor. Subsequently, the first point at its new position (i.e., the position after displacement from its original location) is combined with the other points of the plurality of reference points to form a guidance graphic.

Figure 9:
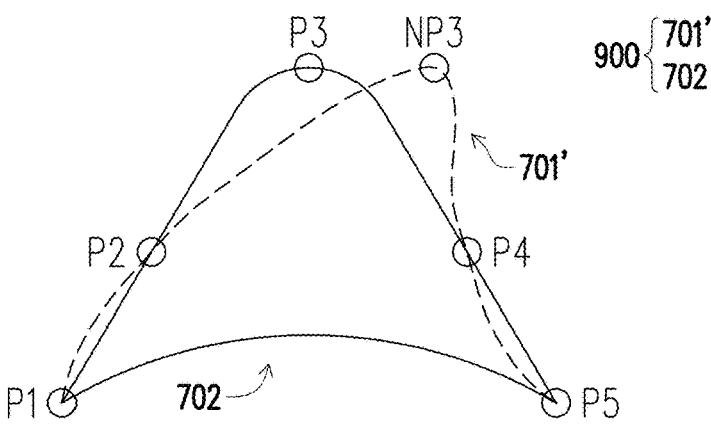
FIG. 9 is a schematic diagram illustrating a change in position according to an embodiment of the present disclosure.

For example, FIG. 9 illustrates a schematic diagram of position change according to an embodiment of the present disclosure. Referring to FIG. 7A, FIG. 7B, and FIG. 9, the reference point NP3 (i.e., the aforementioned first point) at the new position is generated by moving the reference point P3 away from its original position. At this juncture, the guidance graphic 900 includes an upper line 701' and a lower line 702. Specifically, the upper line 701' and the lower line 702 collectively form the guidance graphic 900. The upper line 701' is a Bézier curve connecting reference points P1, P2, NP3, P4, and P5 in sequence, where M1=5. In other words, the processor 130 may generate the upper line 701' using a Bézier curve of M1 points. Similarly, the processor 130 may generate the lower line 702 using a Bézier curve of M1 points. The relocated reference point NP3 is positioned at the apex of the arrowhead. The appearance presented by the guidance graphic 900 enables an observer to comprehend that the road is about to curve to the right.

In an embodiment, the processor 130 may horizontally displace the first point. In response to a larger curvature factor, the horizontal distance by which the first point is displaced from its original position increases. Conversely, in response to a smaller curvature factor, the horizontal distance by which the first point is displaced from its original position decreases. For example, referring to FIG. 7A, FIG. 7B, and FIG. 9, the position on the horizontal axis of the new location is $P3_x \pm (P3_x - P1_x)*|F|$, where $P3_x$ is the position of reference point P3 on the horizontal axis (e.g., X-axis), $P1_x$ is the position of reference point P1 on the horizontal axis, and $|F|$ is the absolute value of the curvature factor F. The horizontal distance between the new position and the original position increases as the absolute value of the curvature factor F increases, and the horizontal distance between the new position and the original position decreases as the absolute value of the curvature factor F decreases. In the +operation, the subtraction "−" represents a left turn, while the addition "+" represents a right turn. Furthermore, in response to a left-curving road, the curvature factor F is the lane curvature of the left boundary line in the road block; in response to a right-curving road, the curvature factor F is the lane curvature of the right boundary line in the road block.

Figure 10:
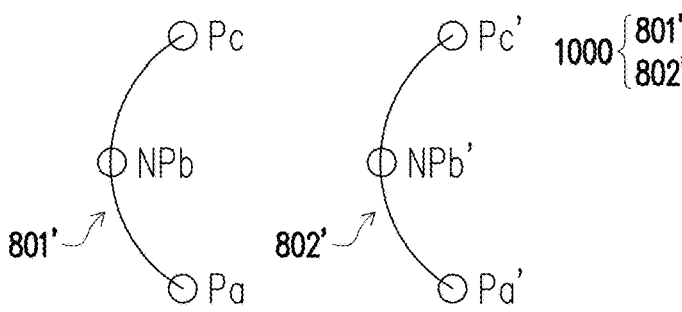
FIG. 10 is a schematic diagram illustrating a position change according to an embodiment of the present disclosure.

For example, FIG. 10 illustrates a position change according to an embodiment of the present disclosure. Referring to FIG. 8 and FIG. 10, the reference point NPb (i.e., the aforementioned first point) at the new position is generated by moving the reference point Pb in FIG. 8 away from its original position, and the reference point NPb' (i.e., the aforementioned first point) at the new position is generated by moving the reference point Pb' in FIG. 8 away from its original position. At this time, the guidance graphic 1000 includes a left line 801' and a right line 802'. In other words, the left line 801' and the right line 802' form the guidance graphic 1000. The left line 801' is a connection line sequentially passing through reference points Pa, NPb, and Pc, and is a Bézier curve with M2 equal to 3. That is to say, the processor 130 may generate the left line 801' using a Bézier curve with M2 points. The right line 802' is a connection line sequentially passing through reference points Pa', NPb', and Pc', and is a Bézier curve with M2 equal to 3. Similarly, the processor 130 may generate the right line 802' using a Bézier curve with M1 points. The relocated reference points NPb and NPb' are positioned in the middle portion of the arrow shaft. The appearance presented by the guidance graphic 1000 allows an observer to understand that the road is about to curve to the right.

The position of the new location on the horizontal axis is $Pb_x\pm(Pb_x-P1_x)*|F|$, wherein $Pb_x$ represents the position of reference point Pb on the horizontal axis (e.g., X-axis), $P1_x$ represents the position of reference point Pa on the horizontal axis, and $|F|$ denotes the absolute value of the curvature factor F. Furthermore, the position of the new location on the horizontal axis is $Pb'_x+(Pb'_x-P1_x)*|F|$, wherein Pb' represents the position of reference point Pb' on the horizontal axis (e.g., X-axis), $P1_x$ represents the position of reference point P1 on the horizontal axis, and $|F|$ denotes the absolute value of the curvature factor F. The distance between the new position and the original position on the horizontal axis increases as the absolute value of the curvature factor F increases, and decreases as the absolute value of the curvature factor F decreases. In the +operation, the subtraction "−" represents a right turn, while the addition "+" represents a left turn, which is opposite to the operation method of the arrowhead.

Figure 11:
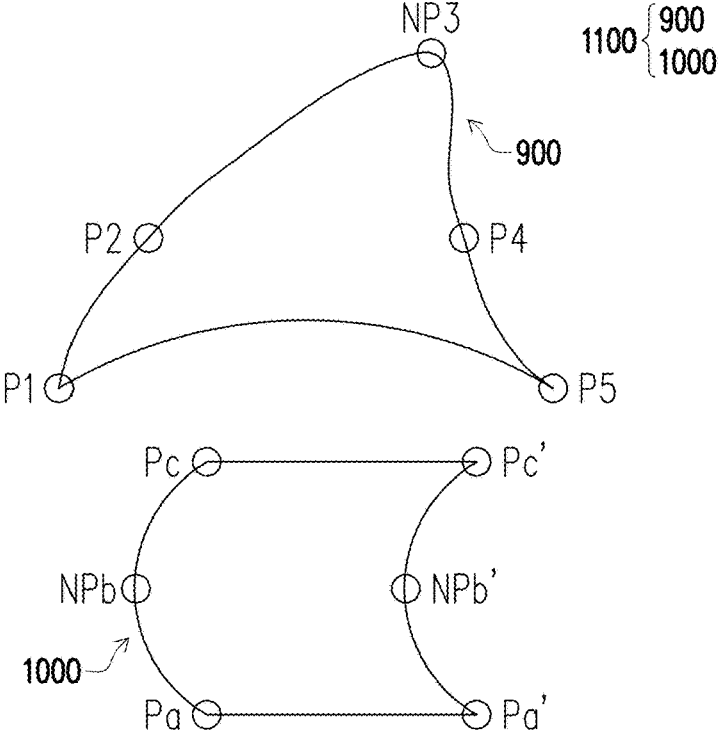
FIG. 11 is a schematic diagram of a guidance graphic according to an embodiment of the present disclosure.

FIG. 11 is a schematic diagram of a guidance graphic 1100 according to an embodiment of the present disclosure. Referring to FIG. 9, FIG. 10, and FIG. 11, the guidance graphic 1100 includes the guidance graphic 900 of FIG. 9 and the guidance graphic 1000 of FIG. 10. The guidance graphic 1000 in FIG. 11 further connects reference point Pc with reference point Pc', and connects reference point Pa with reference point Pa'. The appearance presented by the guidance graphic 1100 enables an observer to comprehend that the road is about to curve to the right.

Please refer to FIG. 2. The processor 130 presents a guidance graphic (step S250). Specifically, the processor 130 may present the guidance graphic via a display (not shown in the figure). The display may be, for example, a display of a dashboard, a central console, a smartphone, a tablet computer, a wearable device, or other electronic device. The processor 130 may transmit an auxiliary image including the guidance graphic through a wired or wireless communication connection. This auxiliary image may be used for navigation, driving assistance, or information provision.

In an embodiment, the processor 130 may combine the guidance graphic and the auxiliary image. The auxiliary image, for example, is the (real-time) image acquired in step S210. For instance, the processor 130 may superimpose the guidance graphic onto the road block in the auxiliary image. Alternatively, augmented reality (AR) technology may be employed to integrate the virtual object (i.e., the guidance graphic) with the (real-time) image.

In another embodiment, the auxiliary image is an image displayed on a head-up display.

In the application scenario described herein, the auxiliary image refers to the real-time forward view from the vehicle. Furthermore, it is assumed that the reference speed is 60 kilometers per hour, the speed of the vehicle is 60 kilometers per hour, and the reference curvature is 1200. In the event that the lane curvature is 5900, it follows that 5900 exceeds 1200, and consequently, this road block corresponds to a straight road. Conversely, if the lane curvature is −945, it follows that the absolute value |−945| is less than 1200, and consequently, this road block corresponds to a curved road. Additionally, it is assumed that the curvature factor is 1.7.

Figure 12A:
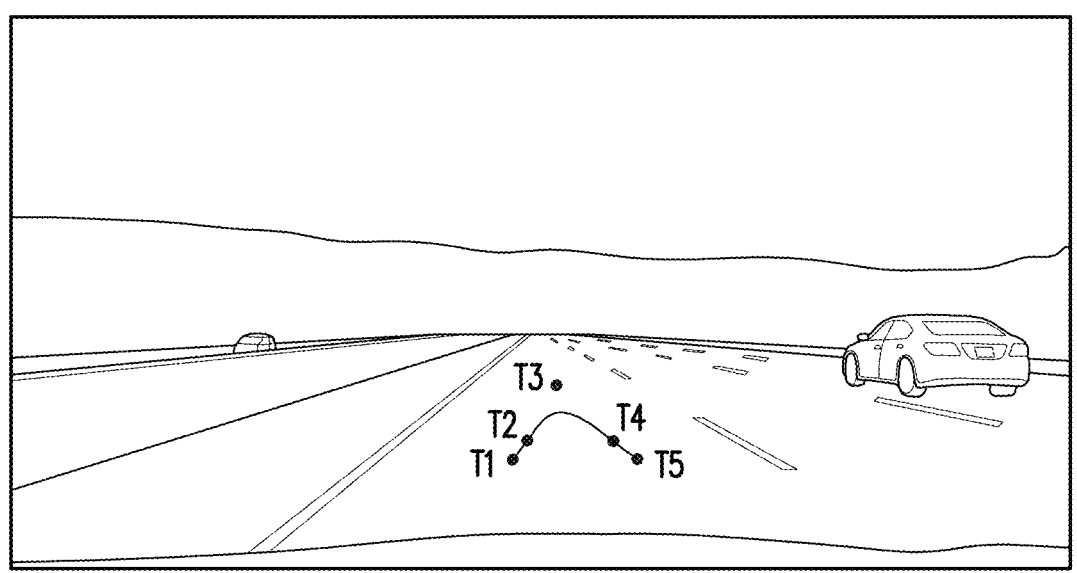
FIG. 12A is a schematic diagram of an upper line of a straight road according to an embodiment of the present disclosure.

FIG. 12A is a schematic diagram of an upper line of a straight road according to an embodiment of the present disclosure. Referring to FIG. 12A, the upper line formed by the reference points T1, T2, T3, T4, and T5 corresponds to the straight road.

Figure 12B:
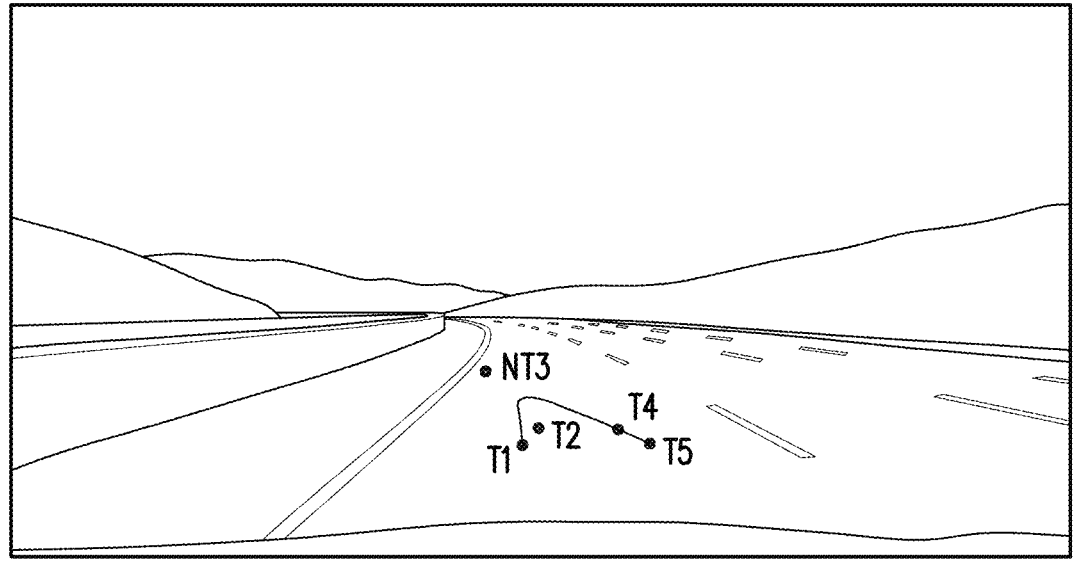
FIG. 12B is a schematic diagram of an upper line of a curved road according to an embodiment of the present disclosure.

FIG. 12B is a schematic diagram of an upper line of a curved road according to an embodiment of the present disclosure. Referring to FIG. 12B, the upper line formed by the reference points T1, T2, NT3, T4, and T5 corresponds to the curved road.

Figure 13A:
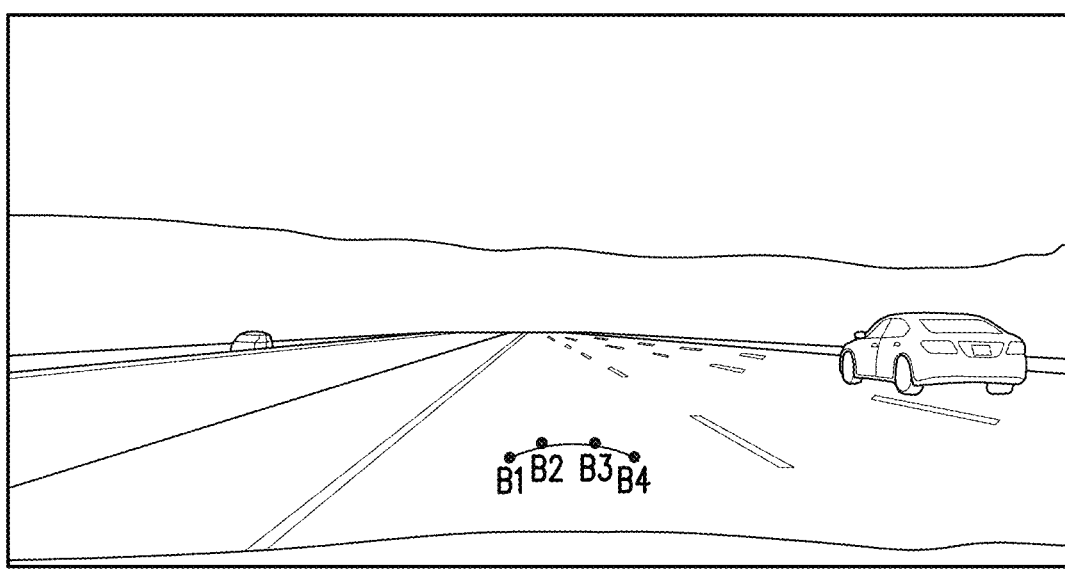
FIG. 13A is a schematic diagram of a lower line of a straight road according to an embodiment of the present disclosure.

FIG. 13A is a schematic diagram of a lower line of a straight road according to an embodiment of the present disclosure. Referring to FIG. 13A, the lower line formed by the reference points B1, B2, B3, and B4 corresponds to the straight road.

Figure 13B:
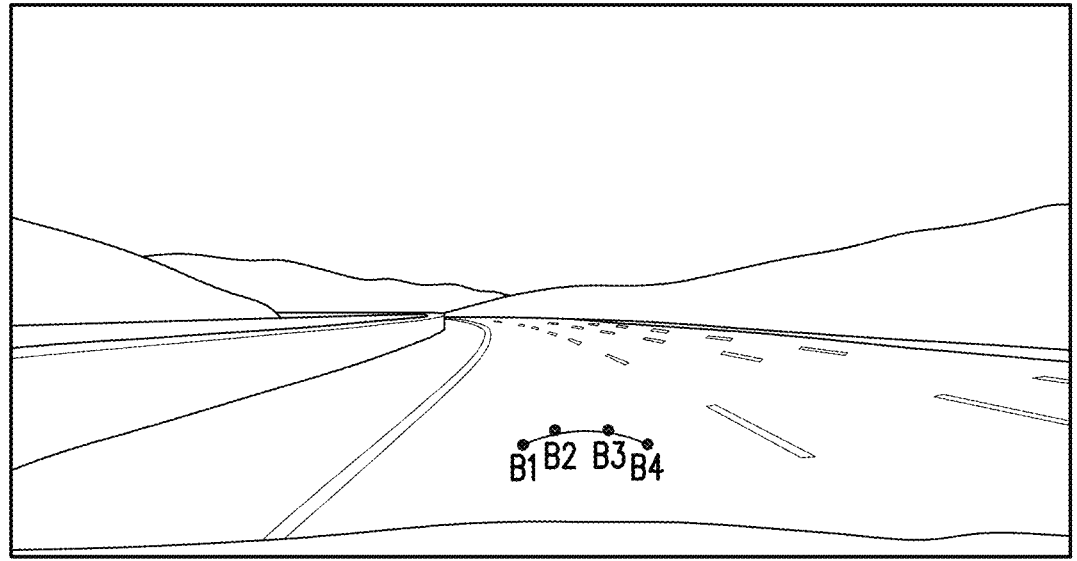
FIG. 13B is a schematic diagram illustrating a lower line of a curved road according to an embodiment of the present disclosure.

FIG. 13B is a schematic diagram of a lower line of a curved road according to an embodiment of the present disclosure. Referring to FIG. 13B, the lower line formed by the reference points B1, B2, B3, and B4 corresponds to the curved road.

Figure 14A:
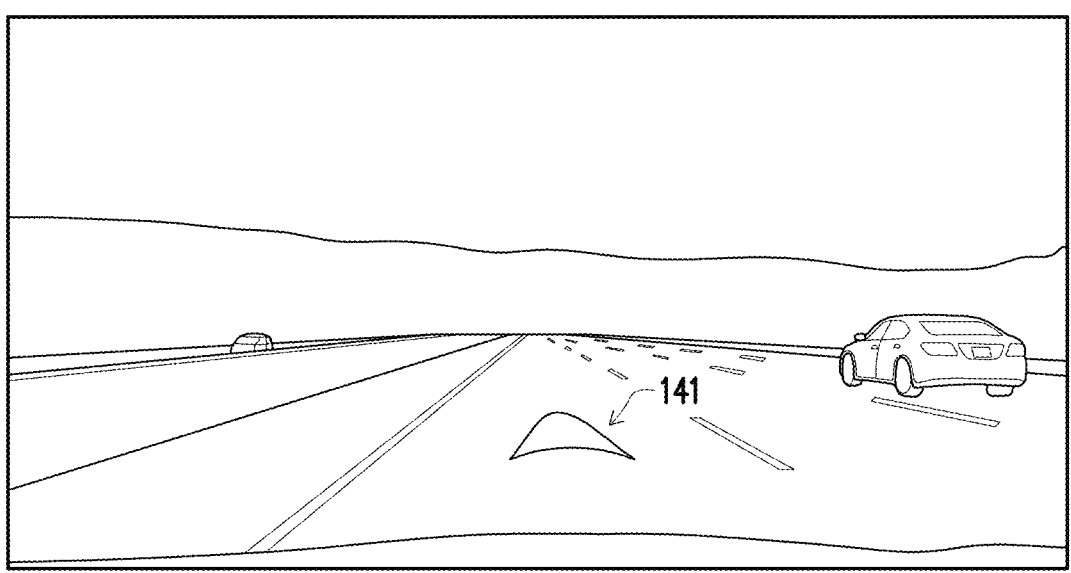
FIG. 14A is a schematic diagram illustrating the combination of upper and lower lines corresponding to a straight road according to an embodiment of the present disclosure.

FIG. 14A is a schematic diagram illustrating the combination of upper and lower lines corresponding to a straight road according to an embodiment of the present disclosure. Please refer to FIG. 12A, FIG. 13A, and FIG. 14A. The guide graphic 141 is formed by the upper line from FIG. 12A and the lower line from FIG. 13A.

Figure 14B:
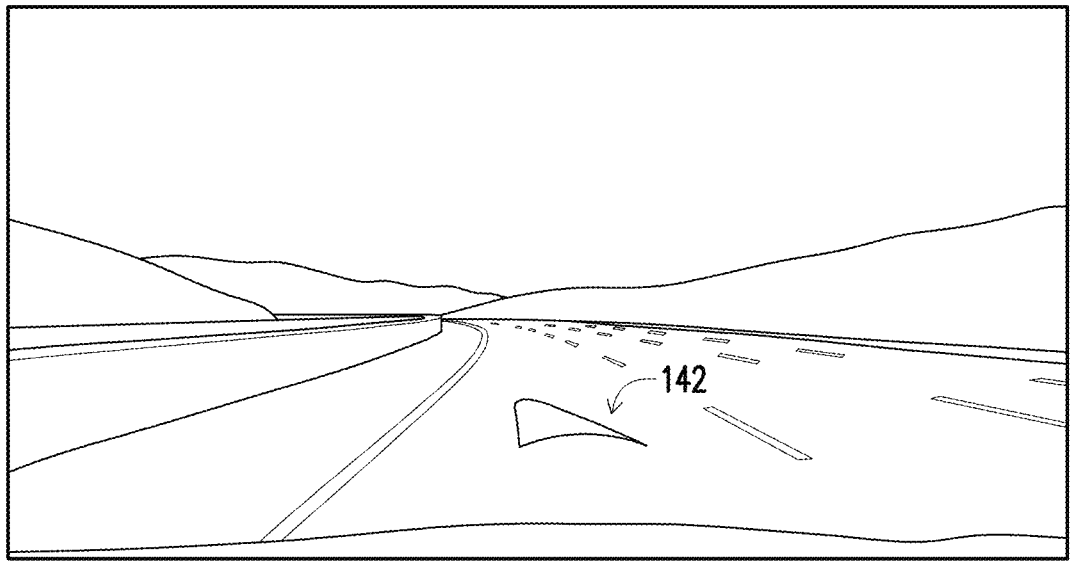
FIG. 14B is a schematic diagram illustrating the combination of upper and lower lines corresponding to a curved road according to an embodiment of the present disclosure.

FIG. 14B is a schematic diagram illustrating the combination of upper and lower lines corresponding to a curved road according to an embodiment of the present disclosure. Please refer to FIG. 12B, FIG. 13B, and FIG. 14B. The guidance graphic 142 is formed by the upper line from FIG. 12B and the lower line from FIG. 13B.

Figure 15A:
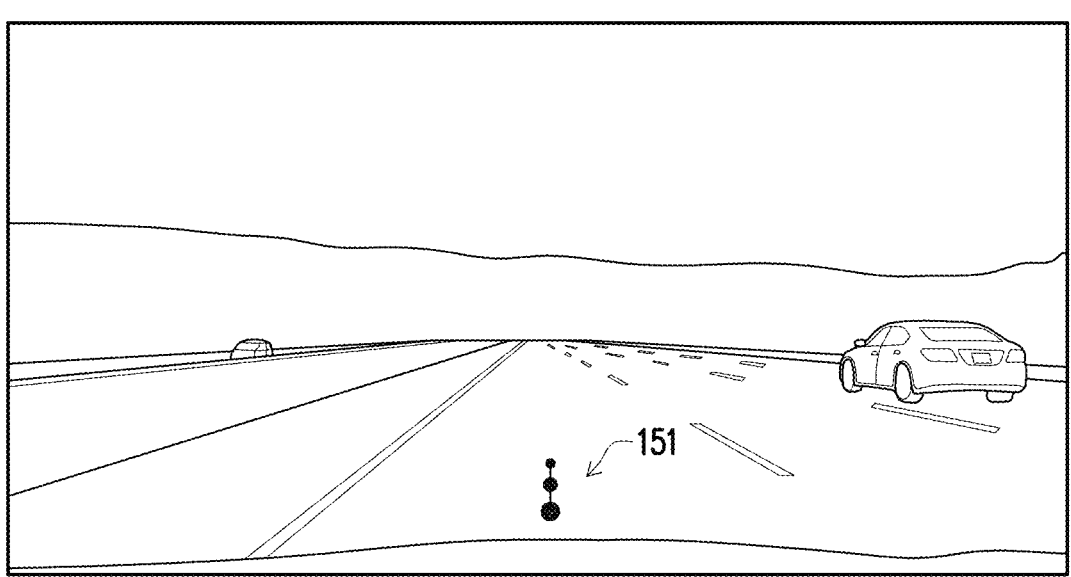
FIG. 15A is a schematic diagram illustrating the arrow shaft base corresponding to a straight road according to an embodiment of the present disclosure.

FIG. 15A is a schematic diagram illustrating the arrow shaft base corresponding to a straight road according to an embodiment of the present disclosure. Please refer to FIG. 15A, wherein the arrow shaft is based on a line formed by three reference points (serving as the guidance graphic 151).

Figure 15B:
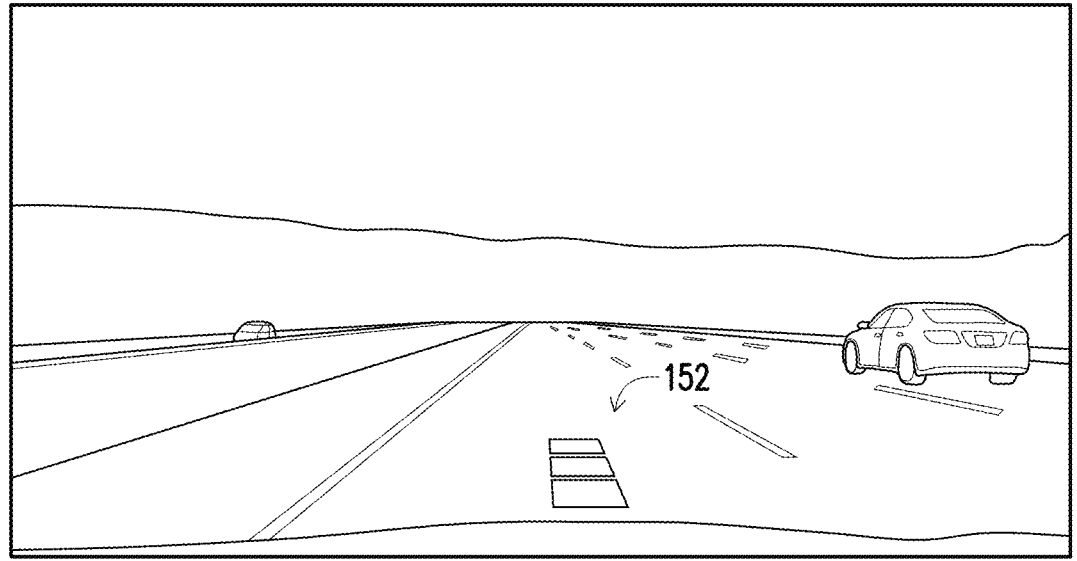
FIG. 15B is a schematic diagram illustrating the arrow shaft corresponding to a straight road according to an embodiment of the present disclosure.

FIG. 15B is a schematic diagram illustrating the arrow shaft corresponding to a straight road according to an embodiment of the present disclosure. Please refer to FIG. 15A and FIG. 15B. The arrow shaft in FIG. 15B includes three rectangles (serving as guidance graphic 152) extended from the arrow shaft base formed by three reference points as shown in FIG. 15A.

Figure 16A:
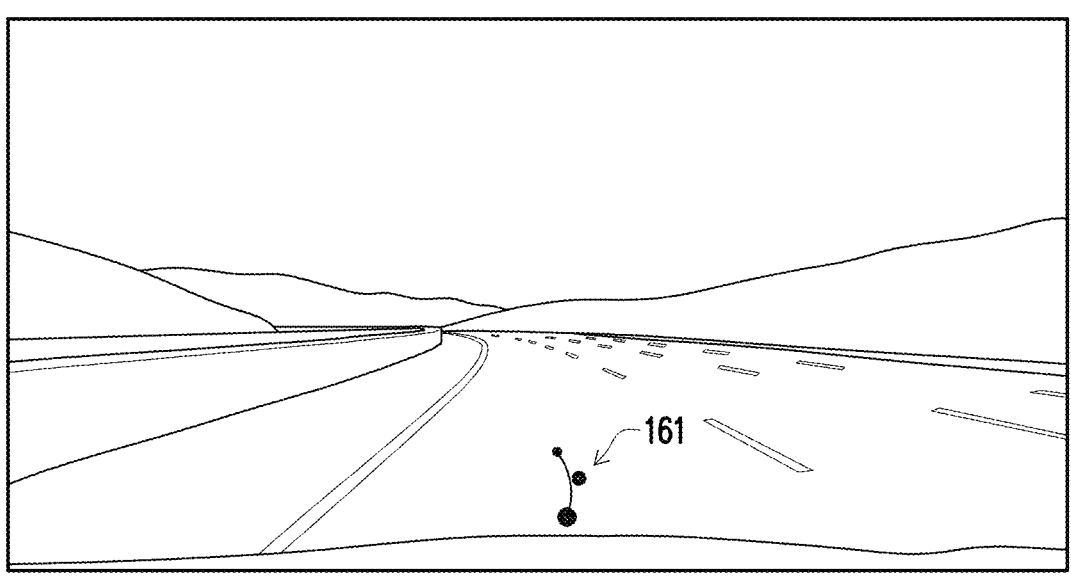
FIG. 16A is a schematic diagram illustrating the arrow shaft base corresponding to a curved road according to an embodiment of the present disclosure.

FIG. 16A is a schematic diagram illustrating the arrow shaft base corresponding to a curved road according to an embodiment of the present disclosure. Please refer to FIG. 16A, which illustrates that the arrow shaft is based on a line formed by three reference points (serving as the guidance graphic 161).

Figure 16B:
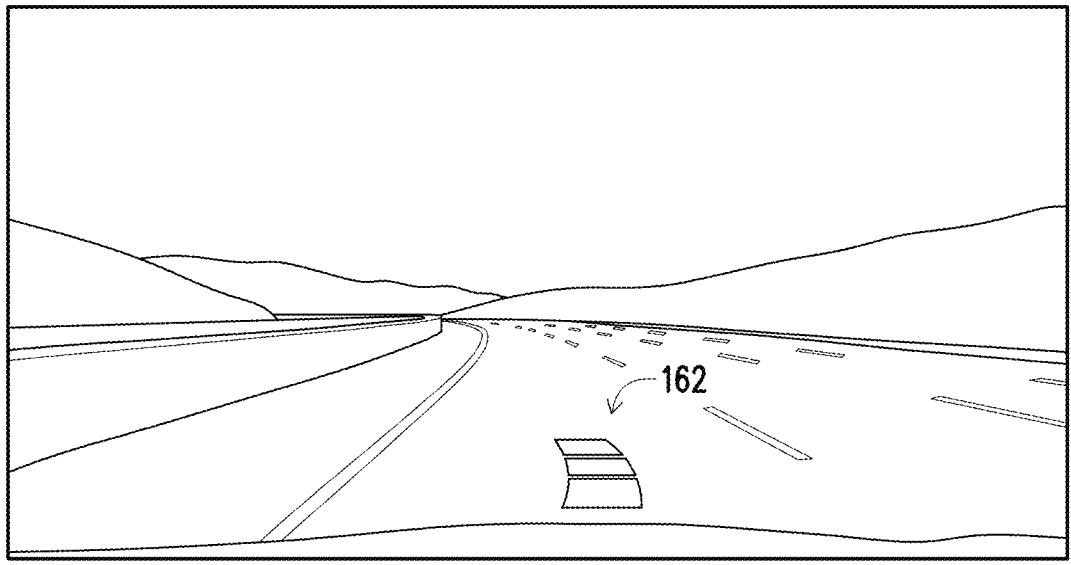
FIG. 16B is a schematic diagram of an arrow shaft corresponding to a curved road according to an embodiment of the present disclosure.

FIG. 16B is a schematic diagram of an arrow shaft corresponding to a curved road according to an embodiment of the present disclosure. Please refer to FIG. 16A and FIG. 16B. The arrow shaft in FIG. 16B includes three rectangles (serving as guidance shapes 162) extending from the arrow shaft base formed by the three reference points shown in FIG. 16A.

Figure 17A:
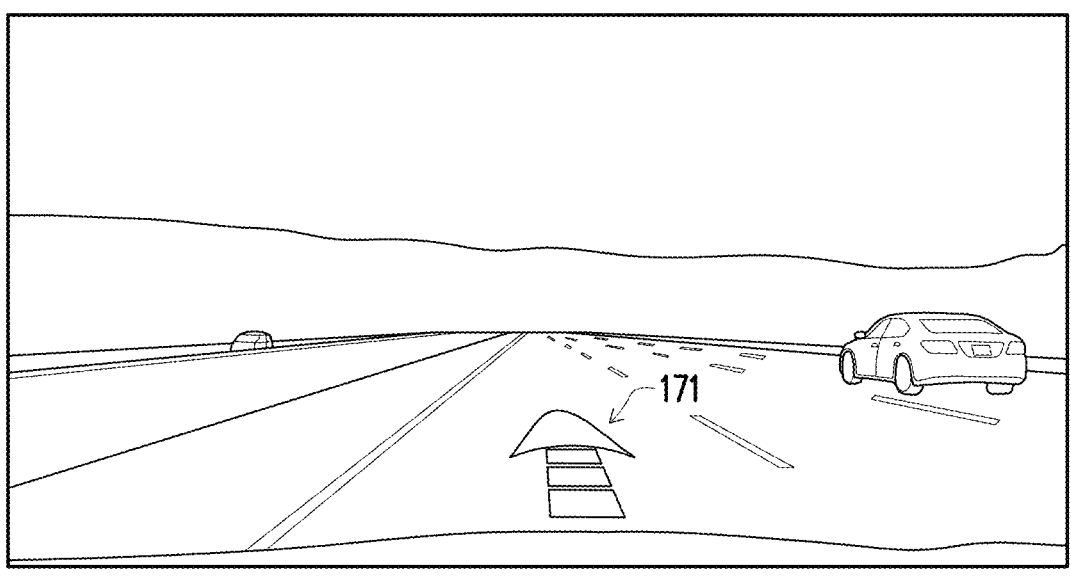
FIG. 17A is a schematic diagram of a guidance graphic corresponding to a straight road according to an embodiment of the present disclosure.

FIG. 17A is a schematic diagram of a guidance graphic 171 corresponding to a straight road according to an embodiment of the present disclosure. Please refer to FIG. 14A, FIG. 15B, and FIG. 17A. The guidance graphic 171 is a combination of the guidance graphic 141 from FIG. 14A and the guidance graphic 152 from FIG. 15B.

Figure 17B:
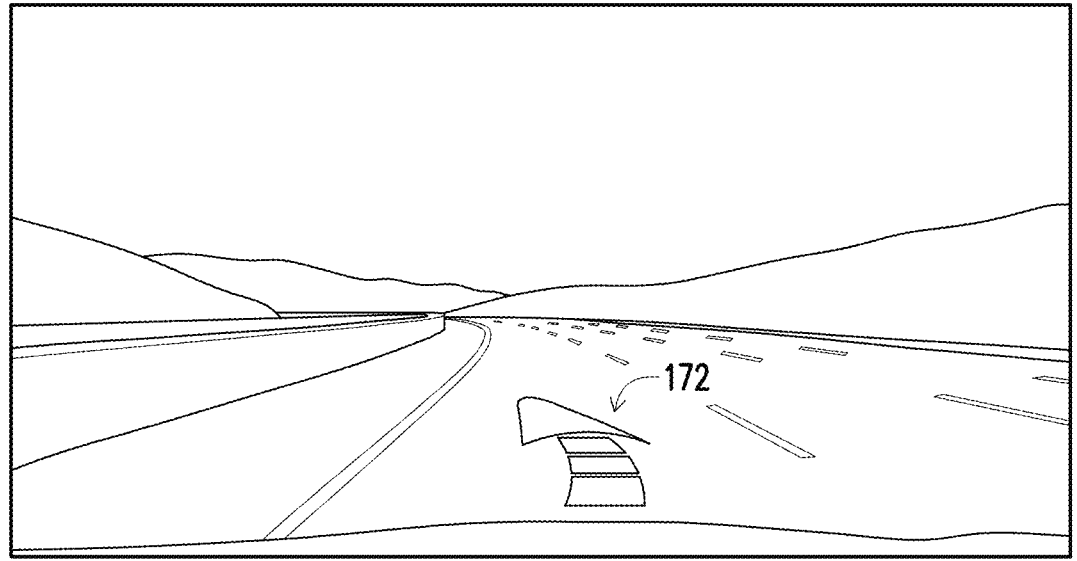
FIG. 17B is a schematic diagram of a guidance graphic corresponding to a curved road according to an embodiment of the present disclosure.

FIG. 17B is a schematic diagram of a guidance graphic 172 corresponding to a curved road according to an embodiment of the present disclosure. Please refer to FIG. 14B, FIG. 16B, and FIG. 17B. The guidance graphic 172 is a combination of the guidance graphic 142 from FIG. 14B and the guidance graphic 162 from FIG. 16B.

Figure 18A:
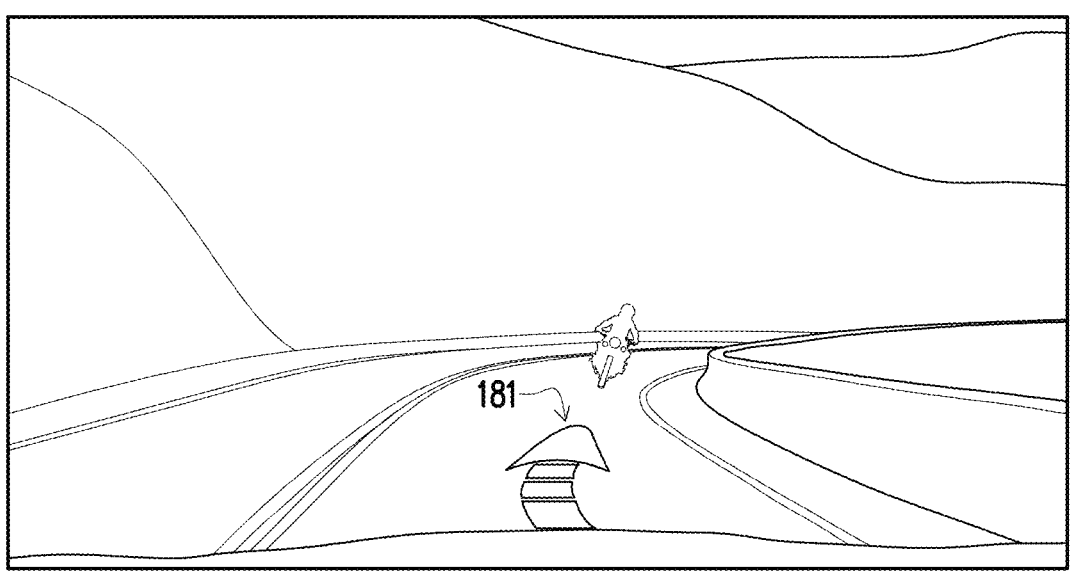
FIG. 18A is a schematic diagram of a guidance graphic corresponding to a curved road according to an embodiment of the present disclosure.
Figure 18B:
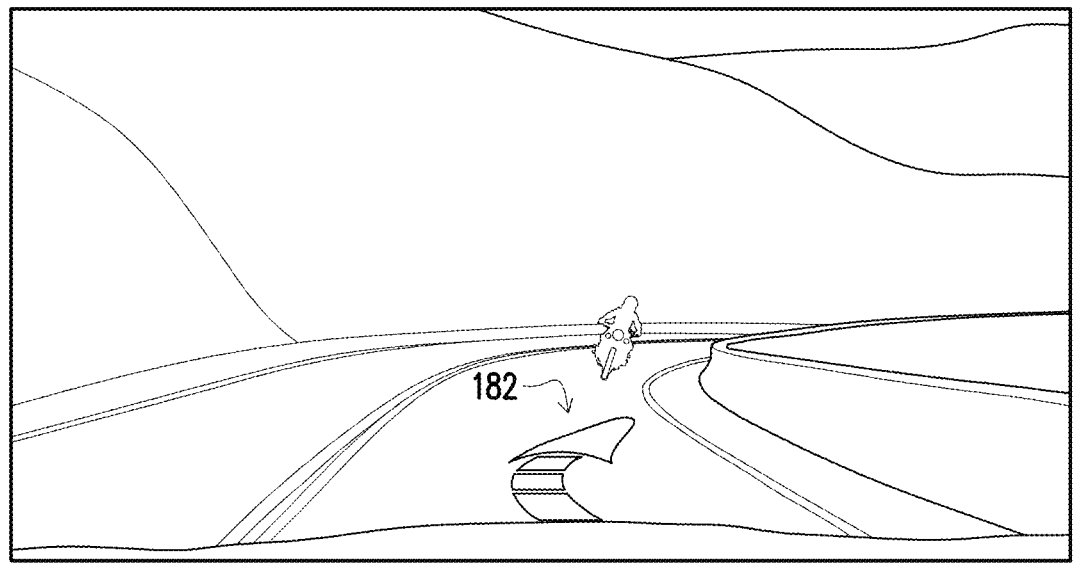
FIG. 18B is a schematic diagram of a pitch-based guidance graphic-adaptive arrow according to an embodiment of the present disclosure.

FIG. 18A is a schematic diagram of a guidance graphic 181 corresponding to a curved road according to an embodiment of the present disclosure, and FIG. 18B is a schematic diagram of a pitch-based guidance graphic 182-adaptive arrow according to an embodiment of the present disclosure. Please refer to FIG. 18A and FIG. 18B. Compared to the guidance graphic 181 shown in FIG. 18A, the guidance curve 182 shown in FIG. 18B takes into account the pitch (for example, $\theta_p$=5 degrees, and the downhill duration t is, for instance, 20 seconds), and consequently, the guidance graphic 182 exhibits a greater degree of curvature.

In an embodiment, the processor 130 may adjust the overall length of the guidance graphic based on speed. For instance, in response to higher speeds, the overall length of the guidance graphic increases; conversely, in response to lower speeds, the overall length of the guidance graphic decreases. By this means, users may intuitively perceive the magnitude of speed through the length of the guidance graphic, which is more intuitive than merely observing the speedometer. This visualized guidance graphic allows users to have a more intuitive experience and contributes to enhancing comfort and driving safety.

In an embodiment, the speed ratio, defined as the speed relative to a reference speed (e.g., the value obtained by dividing the speed by the reference speed), may serve as a speed factor. In an embodiment, the speed factor may be utilized to adjust the basic unit of length step_y on the vertical axis. For instance, the basic unit of length step_y may be multiplied by the speed factor, thereby establishing a proportional relationship between the basic unit of length step_y and the speed factor. In an embodiment, the speed factor may be employed to adjust the vertical axis origin start_y. For example, the vertical axis origin start_y may be multiplied by the speed factor, thus establishing a proportional relationship between the vertical axis origin start_y and the speed factor.

Figure 19A:
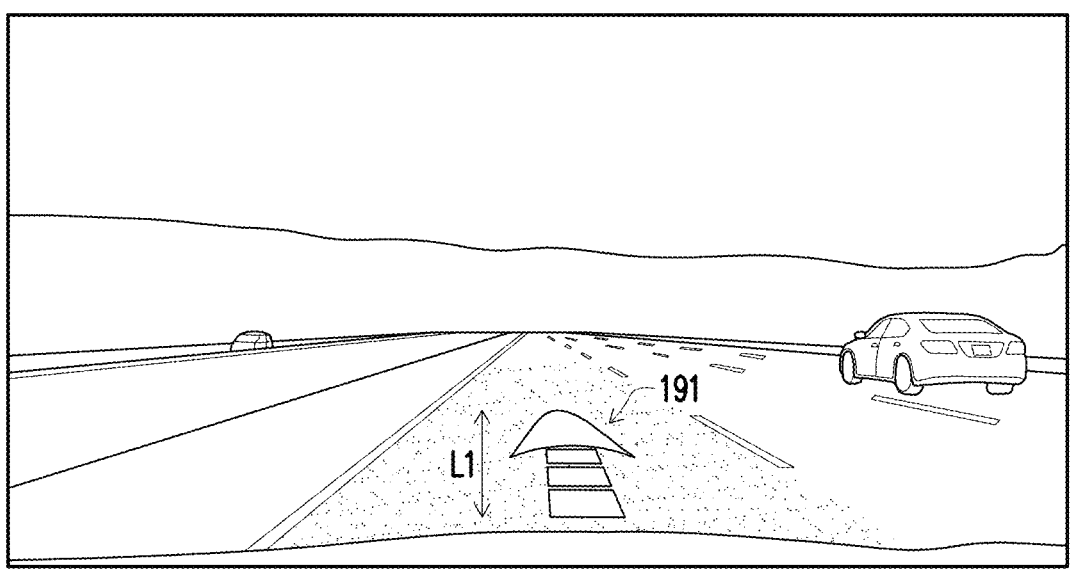
FIG. 19A is a schematic diagram of a guidance graphic corresponding to a straight road according to an embodiment of the present disclosure.
Figure 19B:
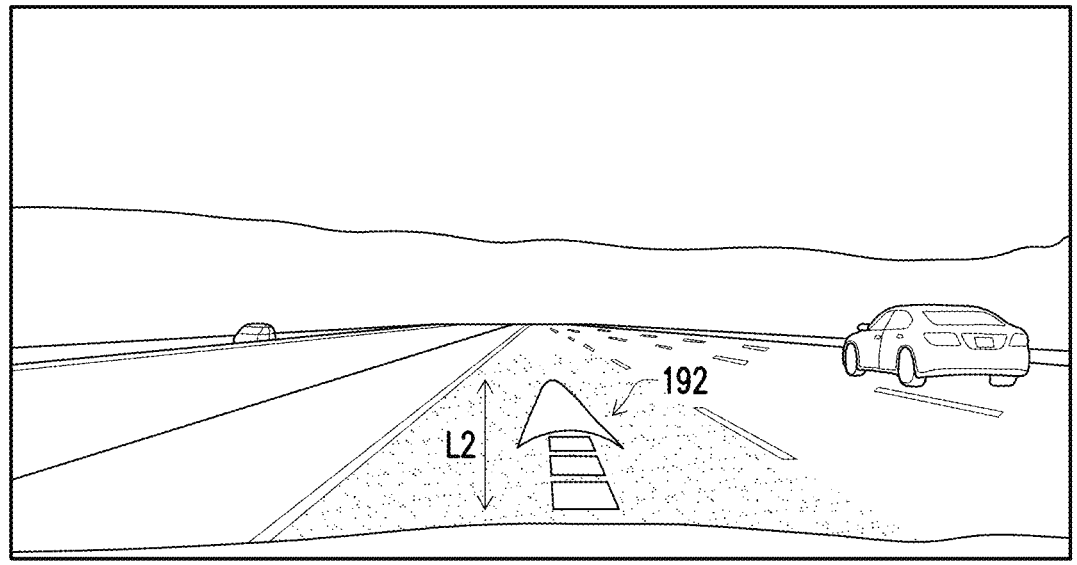
FIG. 19B is a schematic diagram of a speed-based guidance graphic-adaptive arrow according to an embodiment of the present disclosure.

For example, FIG. 19A is a schematic diagram of a guidance graphic 191 corresponding to a straight road according to an embodiment of the present disclosure, and FIG. 19B is a schematic diagram of a speed-based guidance graphic 192-adaptive arrow according to an embodiment of the present disclosure. Referring to FIG. 19A and FIG. 19B, the guidance graphic 192 takes into account the speed factor. When the speed exceeds the reference speed (i.e., the speed ratio is greater than one), the overall length L2 of the guidance graphic 192 is greater than the overall length L1 of the guidance graphic 191.

In light of the foregoing, the guidance method and guidance device in the embodiments of the present disclosure convert the lane curvature of road blocks in the image into a curvature factor based on the speed of the vehicle, and generate a visualized guidance graphic for presentation. The positive or negative value of the curvature factor influences the leftward or rightward curvature of the guidance graphic. When the lane curvature exceeds a certain degree (e.g., greater than a reference curvature), the shape of the guidance graphic may be altered according to the curvature factor. The curvature factor is dependent on the speed of the vehicle. As the speed increases, the curvature factor is correspondingly amplified. Consequently, the speed may affect the degree of curvature in the guidance graphic. By this means, the degree of curvature in the future driving route may be explicitly indicated, thereby reducing the cognitive burden on the driver and enhancing driving safety.

Although the present disclosure has been disclosed above through embodiments, it is not intended to limit the present disclosure. Anyone with ordinary knowledge in the technical field can make some modifications and refinement without departing from the spirit and scope of the present disclosure. Therefore, the scope to be protected by the present disclosure shall be determined by the appended claims.

What is claimed is:

1. A guidance method, comprising:
   obtaining an image and a speed, wherein the image corresponds to a field of view in a traveling direction of a vehicle, and the speed is a movement speed of the vehicle;
   identifying a road block in the image, wherein the road block is an image block corresponding to a road;
   converting a lane curvature corresponding to the road block into a curvature factor according to the speed, wherein the lane curvature corresponds to a curvature of the road block;
   generating a guidance graphic based on the curvature factor; and
   presenting the guidance graphic.

2. The guidance method according to claim 1, wherein the step of converting the lane curvature corresponding to the road block into the curvature factor according to the speed comprises:
   determining a curvature difference between a reference curvature and the lane curvature;
   determining a speed ratio of the speed to a reference speed; and
   determining the curvature factor based on the curvature difference and the speed ratio.

3. The guidance method according to claim 2, wherein the step of determining the curvature factor based on the curvature difference and the speed ratio comprises:
   in response to the reference curvature being greater than an absolute value of the lane curvature, calculating a product of the curvature difference, the speed ratio, and a reciprocal of a proportional coefficient as the curvature factor; and
   in response to the reference curvature not being greater than the absolute value of the lane curvature, setting the curvature factor to an initial value.

4. The guidance method according to claim 1, further comprising:
   determining the speed based on a pitch of the road and a sensed speed of the vehicle.

5. The guidance method according to claim 1, wherein the step of generating the guidance graphic based on the curvature factor comprises:
   altering a position of at least one of a plurality of reference points of a reference graphic based on the curvature factor, wherein connections between the plurality of reference points form the reference graphic.

6. The guidance method according to claim 5, wherein the plurality of reference points comprises a first point, and the step of altering the position of the at least one of the plurality of reference points of the reference graphic based on the curvature factor comprises:

displacing the first point from an original position thereof based on the curvature factor, wherein the first point at a new position is combined with the other points of the plurality of reference points to form the guidance graphic.

7. The guidance method according to claim 6, wherein the step of displacing the first point from the original position thereof based on the curvature factor comprises:

displacing the first point horizontally, wherein
in response to the larger curvature factor, a horizontal distance by which the first point is displaced from the original position thereof increases; and
in response to the smaller curvature factor, the horizontal distance by which the first point is displaced from the original position thereof decreases.

8. The guidance method according to claim 5, further comprising:

generating an upper line using a Bézier curve with M1 points; and
generating a lower line using the Bézier curve with M1-1 points, wherein the upper line and the lower line form the guidance graphic.

9. The guidance method according to claim 5, further comprising:

generating a left line using a Bézier curve with M2 points; and
generating a right line using the Bézier curve with the M2 points, wherein the left line and the right line form the guidance graphic.

10. The guidance method according to claim 1, further comprising:

changing an overall length of the guidance graphic based on the speed.

11. A guidance device, comprising:
a storage, storing a program code; and
a processor, coupled to the storage, and loading the program code to:

obtain an image and a speed, wherein the image corresponds to a field of view in a traveling direction of a vehicle, and the speed is a movement speed of the vehicle;

identify a road block in the image, wherein the road block is an image block corresponding to a road;

convert a lane curvature corresponding to the road block into a curvature factor according to the speed, wherein the lane curvature corresponds to a curvature of the road block;

generate a guidance graphic based on the curvature factor; and present the guidance graphic.

12. The guidance device according to claim 11, wherein the processor is further configured to:

determine a curvature difference between a reference curvature and the lane curvature;

determine a speed ratio of the speed to a reference speed; and determine the curvature factor based on the curvature difference and the speed ratio.

13. The guidance device according to claim 12, wherein the processor is further configured to:

in response to the reference curvature being greater than an absolute value of the lane curvature, calculate a product of the curvature difference, the speed ratio, and a reciprocal of a proportional coefficient as the curvature factor; and in response to the reference curvature not being greater than the absolute value of the lane curvature, set the curvature factor to an initial value.

14. The guidance device according to claim 11, wherein the processor is further configured to:

determine the speed based on a pitch of the road and a sensed speed of the vehicle.

15. The guidance device according to claim 11, wherein the processor is further configured to:

alter a position of at least one of a plurality of reference points of a reference graphic based on the curvature factor, wherein connections between the plurality of reference points form the reference graphic.

16. The guidance device according to claim 15, wherein the plurality of reference points comprises a first point, and the processor is further configured to:

displace the first point from an original position thereof based on the curvature factor, wherein the first point at a new position is combined with the other points of the plurality of reference points to form the guidance graphic.

17. The guidance device according to claim 16, wherein the processor is further configured to:

displace the first point horizontally, wherein
in response to the larger curvature factor, a horizontal distance by which the first point is displaced from the original position thereof increases; and
in response to the smaller curvature factor, the horizontal distance by which the first point is displaced from the original position thereof decreases.

18. The guidance device according to claim 15, wherein the processor is further configured to:

generate an upper line using a Bézier curve with M1 points; and
generate a lower line using the Bézier curve with M1-1 points, wherein the upper line and the lower line form the guidance graphic.

19. The guidance device according to claim 15, wherein the processor is further configured to:

generate a left line using a Bézier curve with M2 points; and
generate a right line using the Bézier curve with the M2 points, wherein the left line and the right line form the guidance graphic.

20. The guidance device according to claim 11, wherein the processor is further configured to:

change an overall length of the guidance graphic based on the speed.

* * * * *